(12) United States Patent
Bradford

(10) Patent No.: US 11,104,358 B1
(45) Date of Patent: Aug. 31, 2021

(54) MATERIAL TRANSPORT APPARATUS, SYSTEM AND METHOD FOR MOVING A LOAD ACROSS A SURFACE

(71) Applicant: Jared Bill Bradford, Visalia, CA (US)

(72) Inventor: Jared Bill Bradford, Visalia, CA (US)

( * ) Notice: Subject to any disclaimer, the term of this patent is extended or adjusted under 35 U.S.C. 154(b) by 331 days.

(21) Appl. No.: 16/202,021

(22) Filed: Nov. 27, 2018

Related U.S. Application Data

(60) Provisional application No. 62/745,458, filed on Oct. 14, 2018.

(51) Int. Cl.

| | | |
|---|---|---|
| *B61B 13/02* | (2006.01) | |
| *B61F 3/08* | (2006.01) | |
| *B61D 3/16* | (2006.01) | |
| *B65G 7/02* | (2006.01) | |
| *B65G 1/133* | (2006.01) | |
| *B65G 1/04* | (2006.01) | |

(52) U.S. Cl.
CPC ................ *B61B 13/02* (2013.01); *B61D 3/16* (2013.01); *B61F 3/08* (2013.01); *B65G 7/02* (2013.01); *B65G 1/0478* (2013.01); *B65G 1/0492* (2013.01); *B65G 1/133* (2013.01)

(58) Field of Classification Search
CPC ........... B61B 13/02; B61B 13/04; B61D 3/16; B61F 3/08; B65G 7/02; B65G 1/0478; B65G 1/0492; B65G 1/133
See application file for complete search history.

(56) References Cited

U.S. PATENT DOCUMENTS

| 4,048,924 | A | * | 9/1977 | Wibben | ................ | E04D 15/04 |
| | | | | | | 104/245 |
| 6,823,799 | B2 | * | 11/2004 | Gleave | .................... | E04D 13/10 |
| | | | | | | 104/111 |
| 7,980,182 | B2 | * | 7/2011 | Pendley | ................. | E04D 15/00 |
| | | | | | | 104/106 |
| 2016/0272221 | A1 | * | 9/2016 | Tasaka | .................... | B66B 9/022 |

\* cited by examiner

*Primary Examiner* — Robert J McCarry, Jr.
(74) *Attorney, Agent, or Firm* — Richard A. Ryan

(57) ABSTRACT

A system and method to move a load across a surface. The system has a track on the surface in a first direction, a track cart that moves the load in the first direction and a transfer cart that moves the load in a second direction on a separate cart path. The surface can be corrugated panels having upstanding ribs and the track can have a mounting assembly that mounts the track to the ribs. The track cart slides under the load, lifts the load off the ribs and moves the load in the first direction. The transfer cart is integrated into a gap in the track so the track cart can move over the transfer cart or stop on the transfer cart to move the load in the second direction on ribs defining the cart path. The method uses the components to move the load across the surface.

26 Claims, 12 Drawing Sheets

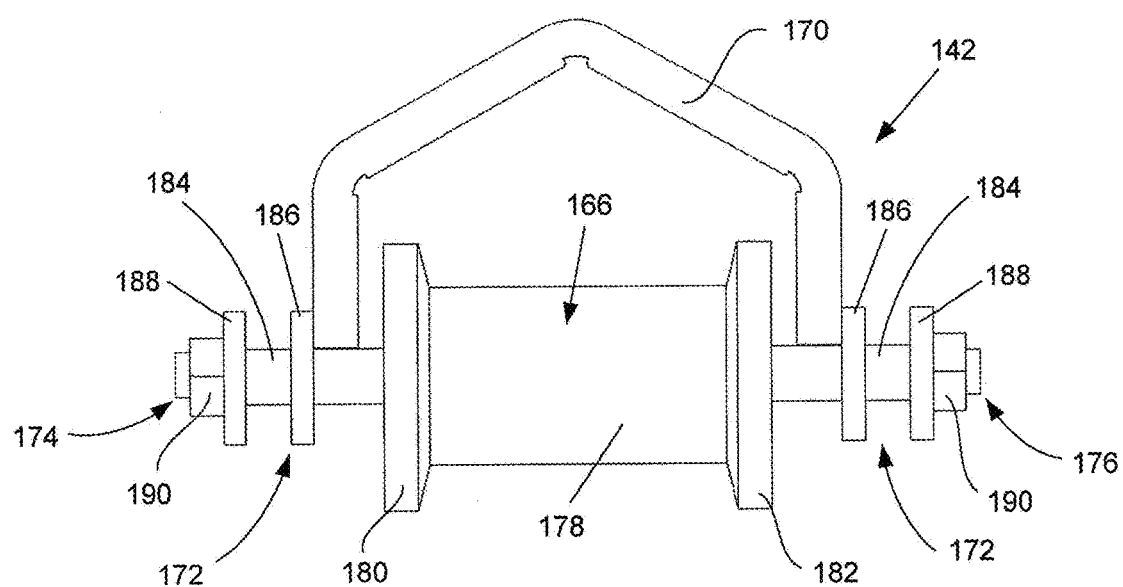
FIG. 15
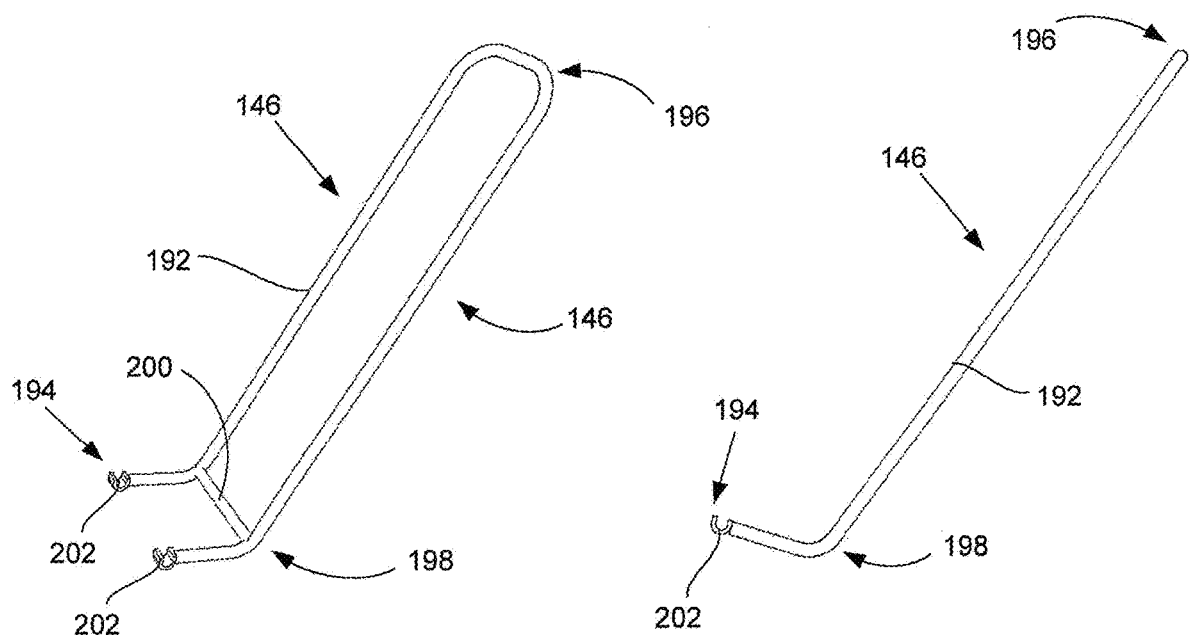
FIG. 16
FIG. 17

MATERIAL TRANSPORT APPARATUS, SYSTEM AND METHOD FOR MOVING A LOAD ACROSS A SURFACE

CROSS-REFERENCE TO RELATED APPLICATIONS

This patent application claims priority to U.S. Provisional Patent Application No. 62/745,458 filed Oct. 14, 2018.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The present invention relates generally to apparatuses, systems and methods that are particularly configured to efficiently, safely and quickly move one or more items across a surface. Specifically, the present invention relates to such apparatuses, systems and methods that allow persons to place items in a staging area and then easily move the items across a surface in order to position the items at a location on the surface where the items can be utilized or installed. More specifically, the present invention relates to such apparatuses, systems and methods that allow the user to efficiently, safely and quickly move items across all types of surfaces, including non-planar and ridged surfaces such as those made of corrugated metal roof panels and the like.

B. Background

Many types of components and materials are utilized in construction, manufacturing and other activities in order to construct a building, road, bridge or other structure, to manufacture a wide variety of items and like objectives. During the completion of the construction, manufacturing and other activities, it is very common to receive one or more components and/or materials, often in bulk form, that will be utilized in such activities to achieve the desired objective of the activity. Typically, the components and/or materials that are delivered are initially placed at a staging area of the job site, manufacturing plant or other work location generally near, or at least as near as is safely and conveniently possible, where the user will install, manipulate or otherwise utilize the materials and/or components during the construction, manufacturing or other activity. As well known, however, it is very common that the components and/or materials that are delivered to the staging area will then have to be moved from the staging area across a surface of the work location to a second area where the components or materials will be utilized. As also well known, it is preferred that the components and/or materials be moved as easily, efficiently and safely as possible to facilitate completion of the work activity and in a manner which avoids injury to persons at the work location and to prevent damage to any of the components and/or materials.

Often, the surface across which the components and/or materials are to be moved is generally planar and spatially open, such as the ground, floor or like surfaces of a job site, manufacturing plant or the like, which makes it relatively easy to move the components and/or materials. In such circumstances, the materials and/or components can be relatively easily, efficiently and safely moved using a standard fork lift, dolly, cart or other commonly available mobile material movers, whether the movers are motorized or manually operated. For non-planar surfaces, however, the standard material movers usually do not work well or, with regard to some types of surfaces, not at all. In particular, surfaces which comprise a plurality of higher and lower levels, such as ribs or ridges and valleys, are very difficult for a user to easily, efficiently and safely and move components and/or materials across, specially if the materials are heavy, large and/or the load comprises a bulk amount of the components/materials. Examples of such surfaces include surfaces that are or comprise a plurality of tracks, such as for rail cars or the like, and surfaces which are made up of a plurality of metal panels, such as those commonly utilized as metal cladding for roofs and exterior walls.

With regard to metal cladding that is utilized for roofs, the metal panels are commonly grouped into three general categories, namely, exposed fastener panels, concealed fastener panels and standing seam panels. These panels are typically machine formed through the use of roll-formers, sheet metal brakes or sheet metal folders from large coils of pre-coated sheet metal, typically ranging in thicknesses of 18 to 29 gauge, to construct the finished or installed shape of the metal panels, which typically range in width between two and four feet and may be of a wide rage of lengths, with some panels being as long as forty feet or more. The typical, mechanical manufacturing method, which has been in use for several decades, produces a somewhat standardized appearance and profile for the metal panels. As a result, there are several styles of panels that are primarily sold by a core group of metal building manufacturers. While metal panels may have different profiles, nearly all of the different styles of panels are corrugated, meaning they comprise a series of ribs and valleys (also referred to as pans and flutes) between the ribs. Each metal panel and its associated corrugations for a particular style of panel are sized and configured to interlock or "corrugate" with other similarly configured panels to provide a continuous, repeatable and predictable pattern on the surface of the roof.

The typical method that is utilized to install metal cladding to form the roof of a building is generally accomplished with a crew of three to five workers who install the metal panels from a position on the roof of the building. The metal panels are received at the job site in stored bundles that usually comprise thirty to forty panels per bundle, typically with the panels in the bundle being prepared or pre-drilled. Initially, at least for larger sized roofs, a section of the roof is completed by raising, often individually, a relatively small number of metal panels to one side or corner of the building and the panels are installed on the roof superstructure to form a staging area for the remaining panels. Once the staging area is formed, the subsequent bundles of panels are raised above the roof line, typically with a crane, and placed on the installed portion of the roof that defines the staging area. From the staging area, the panels are removed from the bundle and carried, usually by hand, to the leading edge of the previously installed roof panels. After positioning the panel on the superstructure, the panel is checked for alignment, measured for squareness and then secured to the building's superstructure by screws or other mechanical fasteners that connect the roof panels to the purlins and/or other frame members. Because the metal panels are heavy and very long, they are typically moved one panel at a time by two or more workers. As will be readily appreciated by persons who are skilled in the art, as panels are attached to the superstructure, the leading edge of the installed panels will continue to move further and further away from the staging area. This results in the workers having to walk longer and longer distance to carry a panel to the leading edge and to go back to the staging area to retrieve the next panel.

The metal cladding for a building typically comprises the metal panels installed over a thermal blanket insulation or over a variety of other materials, such as exterior sheathing or the like. As with the metal panels, the insulation and other materials are typically raised above the roof line with a crane, lift or like devices and placed at the staging area until the workers are ready to install the material on the roof. The workers will also move back and forth between the staging area and the leading edge of the installed panels to position these materials where they are needed for the roof.

As well known by persons who are skilled in the relevant art, the present apparatuses, systems and methods of installing metal panels on the superstructure of a building, is known to be time consuming. In fact, it is not at all uncommon for labor to be a major contributor to the cost of installing a metal roof. As set forth above, much of that labor is utilized just to move metal panels from the staging area to the leading edge of the installed panels. Carrying metal panels and other materials is generally considered to be a non-value added use of expensive skilled labor. For very large roofs, some of the time spent walking back and forth between the staging area and the leading edge of installed panels can be reduced by creating one or more new staging areas that are closer to the leading edge. As well known, however, much of the cost savings for creating new staging areas is often lost due to the need to utilize cranes and/or other equipment, as well as their associated operators, to lift the bundles of metal panels and any other roofing materials off of the ground and place the metal panel bundles and other materials at the new staging area.

In addition to metal panels and insulation and other materials, it is also common to place a variety of other components, equipment, machines and the like on the roof and then secure them in place on or above the metal panels that form the roof. One such example is large, industrial-sized air conditioning, cooling and/or heating units that will be utilized to cool or heat the interior of the building covered by the metal roof. Depending on the size of the unit, a crane or other machine may be used to lift the unit to the staging area where one or more workers will move the unit to the location on the roof where it will be installed. As with the movement of metal panels, the placement of the heating/cooling unit at the staging area and subsequent movement by the workers can be very time consuming and can damage the unit and/or roof or injure one or more of the workers. For larger sized heating or cooling units, a large crane is used to raise the unit above the roof line and reach out across the roof to place the unit in its intended final position. As well known to persons who are skilled in the art, the use of such cranes is generally very expensive and requires extensive planning and preparation.

In addition to metal roof panels, insulating materials and heating or cooling units, a wide variety of other components, materials, equipment, items and the like (hereinafter, collectively referred to as the "load") may be placed at a first area, such as a staging area, of a surface for the purpose of moving the materials to another location, referred to as the second area, on the surface where the load can be beneficially positioned or utilized for one or more useful purposes. For purposes of describing the present invention, the term "load" may refer to a single item, such as the heating or cooling units described above, or it may refer to a collection of like or different items, such as a bundle of metal panels and/or multiple insulating materials, which may be moved collectively or individually to another location on the surface. Likewise, the term "surface" is utilized herein to refer to any type of surface across which the load may be moved, particularly from a staging area to another location, including the ground, floors, streets, roofs and like surfaces. As such, the term "surface" may be made out of concrete, wood, metal, asphalt or virtually any other material and be made in virtually any configuration, including those which are planar and non-planar. For instance, in one embodiment of the present invention, the surface may comprise a plurality of interconnected corrugated metal panels having a series of ribs and valleys extending across the entire area defining the surface.

What is needed, is an improved apparatus, system and method for allowing users to more easily, quickly and efficiently moving a load across a surface. The new apparatus, system and method should be structured and arranged to move a variety of loads across a surface in a manner which is less likely to result in damage to the items, components, materials or the like which make up the load to be moved and/or injury to the workers who are moving the load. In particular, the new apparatus, system and method should be structured and arranged to be utilized to move a load from a first area, such as a staging area or the like, to one or more locations, as the second area, on the surface where the load can be beneficially positioned and/or utilized in the desired manner for such items, components, materials or the like which make up the load. The new apparatus, system and method should be adaptable for use on a wide variety of different types and configurations of surfaces, including non-planar surfaces that are made out of a plurality of interconnected corrugated metal panels having a series of ribs and valleys. Preferably, the new apparatuses and the system and method which use such apparatuses should be easy to use and relatively inexpensive to manufacture.

SUMMARY OF THE INVENTION

The material transport apparatus, system and method for moving a load across a surface of the present invention provides the benefits and solves the problems that are identified above. That is to say, the present invention discloses a new apparatus, system and method to allow a user to relatively easily, quickly and efficiently move a load across a surface. In one embodiment, the present invention allows the user to move a load across a surface from a staging area to a location where the load can be beneficially positioned or utilized in the manner in which the items, components, materials and the like are intended to be used, such as being fixedly installed on the surface. The new apparatus, system and method of the present invention is structured and arranged to be able to move a wide variety of different types and sizes of loads across a surface and to do so in a manner which is significantly less likely to damage the load or cause injury to the workers moving the load. The present invention is particularly useful for moving a load comprising a plurality of individual items, components or materials which are normally manually moved one at a time by the workers. In most circumstances, the present invention will substantially reduce the amount of unproductive time workers typically spend moving such items, components or materials across a surface. Although the new apparatus, system and method is readily adaptable for use with a wide variety of different types and configurations of surfaces, the present invention is particularly useful for moving a load across non-planar surfaces on which conventional material movers cannot be safely or efficiently utilized. In one example, the new apparatus, system and method of the present invention can be beneficially utilized to move a load across a surface, such as a roof, comprising a plurality of interconnected corrugated metal panels having have a series of ribs and valleys. In the preferred configurations, the new apparatus, system and method is easy to use and relatively inexpensive to manufacture.

With regard to use of the present invention on a roof comprising a plurality of corrugated metal panels, the present invention significantly decreases the amount of time that will be required for users to individually move metal panels from one or more bundles of panels from a first area, such as a staging area on the roof, to a second area, such as at or near the leading edge of previously installed roof panels. The present invention, which includes multiple apparatuses, tools, systems and their intended methods of use, allows users to easily, quickly, efficiently and safely move a bundle of metal panels from the staging area to a location on the surface that is close to the leading edge where the next metal panels will be installed. As such, workers will not need to carry one metal panel at a time across the uneven surface of the roof in order to place the metal panel in position for attachment to the roof superstructure, which will lessen the amount of non-value added labor of moving the metal panels. The present invention also eliminates the need to create multiple staging areas, which requires multiple uses of a crane or like machines, often over multiple days, in an attempt to reduce the amount of distance required for manual movement of the metal panels. The present invention is also useful to move a variety of other items, components, materials and the like, including insulation and like materials, and a single heavy item such as a heating/cooling unit across the surface of a metal roof. As such, the present invention is likely to significantly reduce the labor costs for many metal roof installations.

In one embodiment of the present invention, the new system for moving a load across a surface from a first area to a second area of the surfaces generally comprises a track assembly, a track cart and a transfer cart. The track assembly has a plurality of cart rails that are configured to be attached to the surface in order to define the first area where the load is positioned and a track that is configured to allow the load to to be moved in a first direction from the first area to or toward the second area. Each of the cart rails has a rail body that defines a rail profile. The track cart is structured and arranged to support the load thereon and to moveably engage the track in order to move the load in the first direction across the surface. The track cart has a cart base and one or more, typically a plurality of, mobility assemblies. The cart base is configured to be placed under the load while the load is positioned on the track at the first area. Each of the mobility assemblies are structured and arranged in corresponding relation to the rail profile of the cart rails so as to moveably engage the track and allow movement of the load in the first direction along the track. The transfer cart is structured and arranged to receive the track cart, with the load thereon, and to move the track cart in a second direction toward the second area along a cart path that is associated with the surface. The transfer cart has a support rail member which is structured and arranged in corresponding relation to the rail profile of the cart rails so as to be placed in alignment with the cart rails to further define the track and allow the one or more mobility assemblies of the track cart to move across the transfer cart in the first direction.

In one embodiment, the track cart has a first mobility assembly at a first end of the cart base, a second mobility assembly at a second end of the cart base and a cart handle that is adapted to be attached to the cart base. In one configuration, the cart handle is cooperatively structured and arranged with the cart base to engage the cart base under the load and lift at least one of the first end and the second end of the cart base to secure, respectively, the first mobility assembly to the first end of the cart base and/or the second mobility assembly to the second end of the cart base. The cart base can have a first arm member, a second arm member and a cross-member to form the cart base in a U-shaped configuration which defines an arm gap that is open at a first end of the cart base to allow the first end of the cart base to be slid under the load when the load is sitting on the track assembly at the first area of the surface. In one of the preferred embodiments, each of the mobility assemblies has a roller wheel mounted on an elongated axle extending outwardly from the roller wheel and a mobility mounting device at each of a first end and a second end of the axle, the cart frame has a mobility assembly mount for each of the mobility assemblies that is structured and arranged to engage the respective mobility mounting device so as to secure each of respective mobility assemblies to the respective ends of the cart base.

In one embodiment, the rail body of each cart rail has a center section with an upwardly positioned surface and each of the mobility assemblies of the track cart have a roller wheel that is sized and configured to moveably engage the center section and roll along the surface thereof to allow the track cart to move across the surface in the first direction. The track assembly can comprise at least one rail mounting assembly for each of the cart rails, with each of the rail mounting assemblies being configured to securely engage the surface and to receive one of the cart rails thereon to secure the cart rail on the surface and to define the track. Each of the rail mounting assemblies can have a rail section that is cooperatively configured with the rail profile of the rail body to securely receive the cart rail thereon. In one embodiment, the surface is made up of a plurality of corrugated panels that each have one or more ribs associated therewith and each of the rail mounting assemblies has a securing mechanism that is structured and arranged to engage a rib of one of the plurality of corrugated panels to secure the rail mounting assembly to the surface. More specifically, the surface can comprise a plurality of corrugated panels that each have upwardly extending ribs that define the cart path for moving the transfer cart in the second direction, the track assembly comprises at least one rail mounting assembly for each of the cart rails, each of the rail mounting assemblies has a rail section and a securing mechanism associated with the rail section, and the rail section is sized and configured to receive one of the plurality of cart rails thereon to hold the track on the surface, with the securing mechanism being structured and arranged to engage one of the upwardly extending ribs so as to secure the rail mounting assembly to one of the plurality of corrugated panels.

In one configuration, the transfer cart has a transfer cart frame, one or more transfer mobility assemblies attached to the transfer cart frame and a pivot assembly interconnecting the transfer cart frame and the support rail member, with each of the transfer mobility assemblies being structured and arranged to moveably engage the cart path, the pivot assembly being structured and arranged to move the transfer cart between a lowered position wherein the support rail member is integrated into the track and a raised position where the support rail member is separated from the track, and each of the transfer mobility assemblies are engaged with the cart path to allow movement of the transfer cart along the cart path in the second direction. In this configuration, each of the transfer mobility assemblies can comprise one or more wheel members and one or more struts, with each of the one or more wheel members being configured to moveably engage the cart path and each of the one or more struts being configured to distribute the weight of the load along the cart path. In one embodiment, the surface comprises a plurality of corrugated panels that each have one or more upwardly extending ribs that define the cart path and the one or more wheel members of the transfer mobility assemblies are configured to moveably engage the ribs defining the cart path.

In another embodiment of the present invention, the new method for moving a load across a surface from a first area to a second area of the surface generally comprises the steps of: (1) providing a surface having at least a first area and a second area; (2) positioning a track assembly on the surface to define a track across the surface that will allow the load to be moved from the first area across the surface in a first direction to a gap in the track wherein a cart path extends in a second direction to allow the load to be moved toward the second area; (3) placing the load on the track at the first area of the surface; (4) engaging the load at the first area with a transfer cart having a cart base with one or more mobility assemblies associated therewith, with the cart base being structured and arranged to support the load above the track and each of the one or more mobility assemblies being configured to moveably engage the track; (5) moving the load across the surface with the track cart, as it engages the track, along the track in the first direction; (6) positioning the track cart on a transfer cart integrated into the track at the gap in the track; (7) separating the transfer cart from the track and moveably engaging the transfer cart with the cart path; and (8) moving the transfer cart, with the track cart and the load thereon, along the cart path in the second direction toward the second area. In one configuration, the surface comprises a plurality of corrugated panels that each have one or more upwardly extending ribs, the track assembly has a plurality of cart rails and a rail mounting assembly for each of the cart rails, each of the rail mounting assemblies has a rail section and a securing mechanism associated therewith so as to engage one of the ribs to secure the rail section to the surface, and the rail section is cooperatively configured with the cart rails to receive one of the cart rails thereon to hold the track assembly on the surface. Each of the cart rails can have a rail body with a center section having an upwardly positioned surface and each of the mobility assemblies of the track cart have a roller wheel that is sized and configured to moveably engage the center section and roll along the surface thereof to allow the track cart to move across the surface in the first direction. In one of the preferred configurations, the new method further comprises the step of securing the track cart to the transfer cart prior to the step of separating the transfer cart from the track and moveably engaging the transfer cart with the cart path.

In another embodiment, the method further comprises the step of positioning the transfer cart in the gap of the track before the step of positioning the track cart on the transfer cart, with the track having a plurality of track rails that each have a rail body which defines a rail profile and the transfer cart having a support rail member that has a member profile configured in corresponding relation to the rail profile of the rail body of the track rails so as to integrate the support rail member of the transfer cart into the track to allow the track cart to move across the transfer cart when the track cart is moving in the first direction. The surface can comprise a plurality of corrugated panels that each have one or more upwardly extending ribs which define the cart path and the track cart has one or more transfer mobility assemblies that are each configured to moveably engage the ribs defining the cart path so as to allow the transfer cart to be moved in the second direction. The transfer cart can further comprise a transfer cart frame and a pivot assembly interconnecting the transfer cart frame and the support rail member, with the one or more transfer mobility assemblies being attached to the transfer cart frame and the pivot assembly being structured and arranged to move the transfer cart between a lowered position wherein the support rail member is integrated into the track and a raised position where the support rail member is separated from the track and each of the transfer mobility assemblies are engaged with the cart path to allow movement of the transfer cart along the cart path in the second direction.

Accordingly, the primary objective of the present invention is to provide an improved apparatus, system and method for moving a load, comprising one or more items, components, materials or the like, across a surface that has the benefits described above and elsewhere herein and which overcomes the various limitations and problems that are associated with currently available apparatuses, systems and methods for moving such loads across a surface.

It is also a primary objective of the present invention to provide an improved apparatus, system and method for moving a load across a surface that is configured to allow the user to easily and more efficiently and safely move the load across a wide variety of surfaces, including surfaces having a plurality of ribs and valleys, in a manner which allows the user to reduce time spent manually moving the load.

An important aspect of the present invention is that it provides a new apparatus, system and method for moving a load across a surface that achieves the goals of the above-described objectives.

Another important aspect of the present invention is that it provides an improved apparatus, system and method for moving a load across a surface which can be utilized to move a wide variety of different types of items, components and materials across a wide variety of different types of surfaces in a manner that reduces the amount of time necessary to otherwise move the load across the surface.

Another important aspect of the present invention is that it provides an improved apparatus, system and method for moving a load across a surface which allows the user to quickly and efficiently move the load from a first area, such as a staging area, associated with the surface to a second area on the surface where the items, components and materials can be installed or otherwise utilized on the surface.

Another important aspect of the present invention is that it provides an improved apparatus, system and method for moving a load across a surface which allows the user to easily, quickly and safely move the load across a wide variety of surfaces, including those having a plurality of ridges, such as formed by the ribs and valleys of corrugated metal panels, that would otherwise require a significant amount of labor to move the load across the surface.

Another important aspect of the present invention is that it provides an improved apparatus, system and method for moving a load across a surface which comprises non-motorized moving apparatuses that are structured and arranged to lift the load above the surface and moveably engage rails or ridges on the surface to easily, efficiently and safely move the load from a staging area to an area where the items, components, materials and the like can be attached to or otherwise utilized on the surface.

Another important aspect of the present invention is that it provides an improved apparatus, system and method for moving a load across a surface which is particularly structured and arranged for use to install a metal roof comprising a plurality of corrugated metal panels having ribs and valleys to move a bulk load of the metal panels (i.e., a panel bundle) across the ribbed surface to place the panel bundle near the leading edge of previously installed panels.

Another important aspect of the present invention is that it provides an improved apparatus, system and method for moving a load across a surface which can be utilized to move a wide variety of items, components, materials and the like, including bulk loads of panels, insulation materials and large items (including items such as heating and cooling units), across a ribbed surface, such as a roof formed from corrugated metal panels, to place the load at a location where the items, components or materials can be attached to or otherwise beneficially utilized on the surface.

It is also an important aspect of the present invention to provide a new system and method for moving a load across a surface which comprises a track laid out on the a surface, a track cart which moves on the track to move the load in a first direction across the surface and a wheeled rib-engaging transfer cart to move the load in a different or second, such as perpendicular, direction to allow the user to position the load where the items, components or materials can be attached to and/or beneficially utilized on the surface.

Yet another important aspect of the present invention is that it provides an improved apparatus, system and method for moving a load across a surface which is easy to use and relatively inexpensive to manufacture.

As will be explained in greater detail by reference to the attached figures and the description of the preferred embodiments which follows, the above and other objects and aspects are accomplished or provided by the present invention. As set forth herein and will be readily appreciated by persons who are skilled in the art, the present invention resides in the novel features of form, construction, mode of operation and combination of processes presently described and understood by the claims. The description of the invention which follows is presented for purposes of illustrating one or more of the preferred embodiments of the present invention and is not intended to be exhaustive or limiting of the invention. As will be readily understood and appreciated, the scope of the invention is only limited by the claims which follow after the discussion.

BRIEF DESCRIPTION OF THE DRAWINGS

In the drawings which illustrate the preferred embodiments and the best modes presently contemplated for carrying out the present invention:

FIG. 15 is an end view of one of the mobility assemblies of the track cart of FIG. 13;

FIG. 16 is a side perspective view of the handle of the track cart of FIG. 12;

FIG. 17 is a side view of the handle of FIG. 16;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth in the text below. The enclosed figures are illustrative of one or more potential preferred embodiments and, therefore, are included to represent several different ways of configuring the present invention. Although specific components, materials, configurations and uses are illustrated, it should be understood that a number of variations to the components and to the configuration of those components described herein and shown in the accompanying figures can be made without changing the scope and function of the invention set forth herein. For instance, although the description and figures included herewith generally describe and show particular materials, shapes and configurations for the various components of the material transport apparatuses, system and method of the present invention and an example of a load, surface, corrugated metal panel and building with which the new apparatuses, system and method may be utilized therewith, persons who are skilled in the art will readily appreciate that the present invention is not so limited. In addition, the exemplary embodiments of the present apparatuses, system and method are shown and described with only those components which are required to disclose the present invention. It may be that some of the necessary elements for attaching and using the present invention are not shown or are not necessarily described below, but which are well known to persons skilled in the relevant art. As will be readily appreciated by such persons, the various elements of the present invention that are described below may take on any form consistent with forms that are readily realized by persons of ordinary skill in the art having knowledge of prior art apparatuses, systems and methods for moving a load across a surface.

Figure 5:
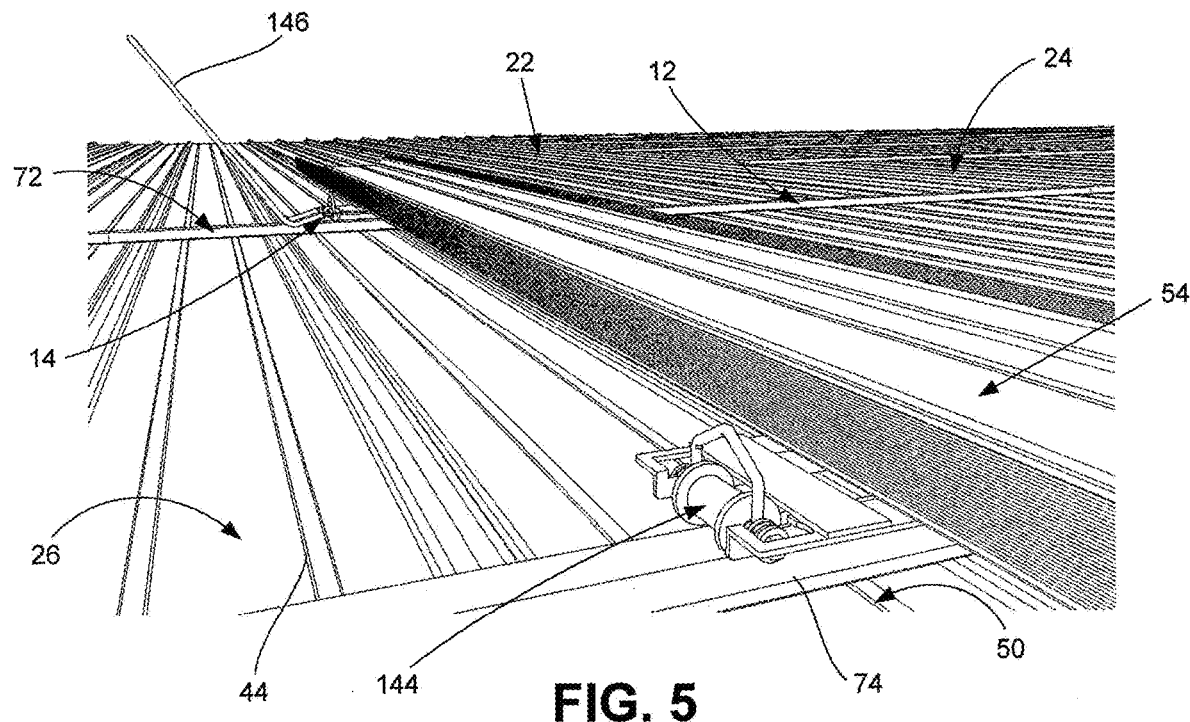
FIG. 5 is a front perspective view of a pair of track carts that are configured according to a preferred embodiment of the present invention shown in use moving a bulk load of metal panels across the roof and cart rails of FIG. 4, with one of the rolling carts shown without its handle to better illustrate the features of the cart base and mobility assembly thereof.
Figure 6:
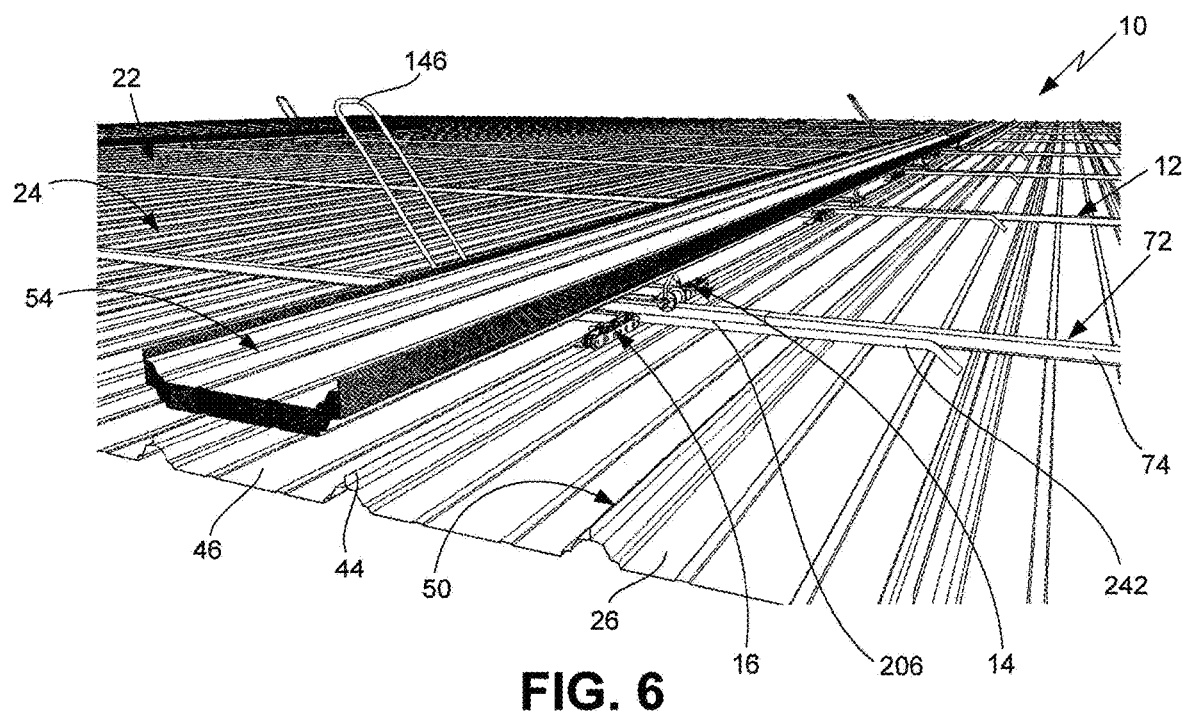
FIG. 6 is a front perspective view of the pair of track carts and bulk load of metal panels of FIG. 5 shown with the track cart positioned on top of a wheeled rib-engaging transfer cart for movement of the metal panels on the ribs of the metal roof in a second direction that is generally perpendicular to the first direction defined by the cart rails.
Figure 20:
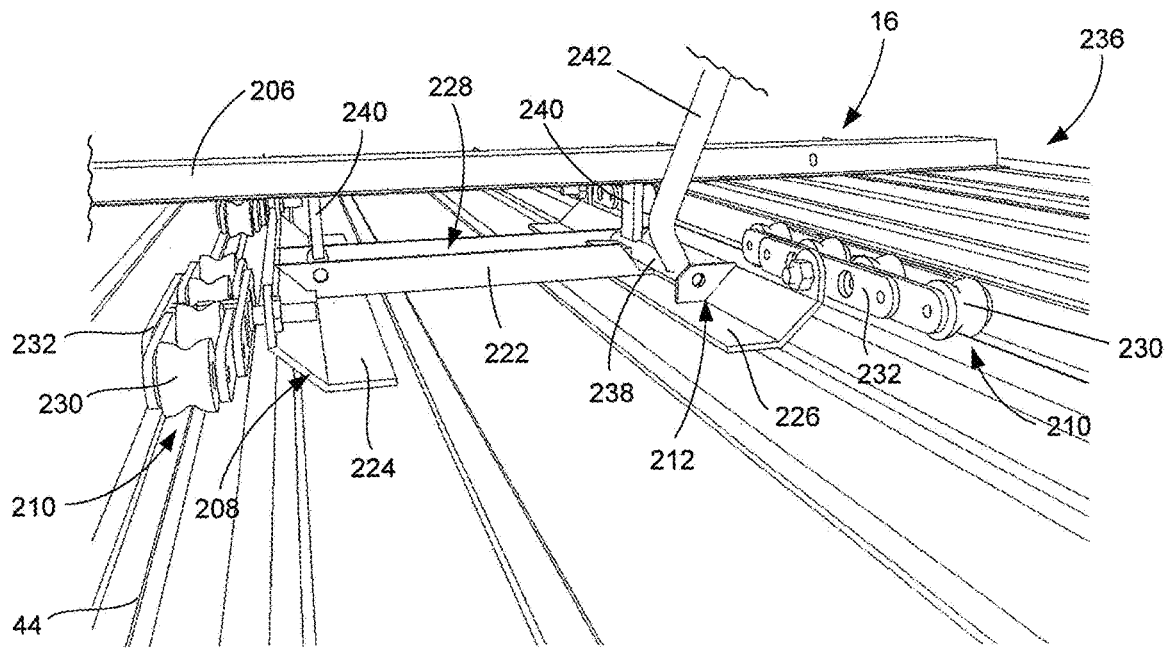
FIG. 20 is an end perspective view of the transfer cart of FIG. 19 with the transfer cart shown in its raised or moving position allowing movement of the transfer cart along a cart path defined by the pair of ribs.
Figure 21:
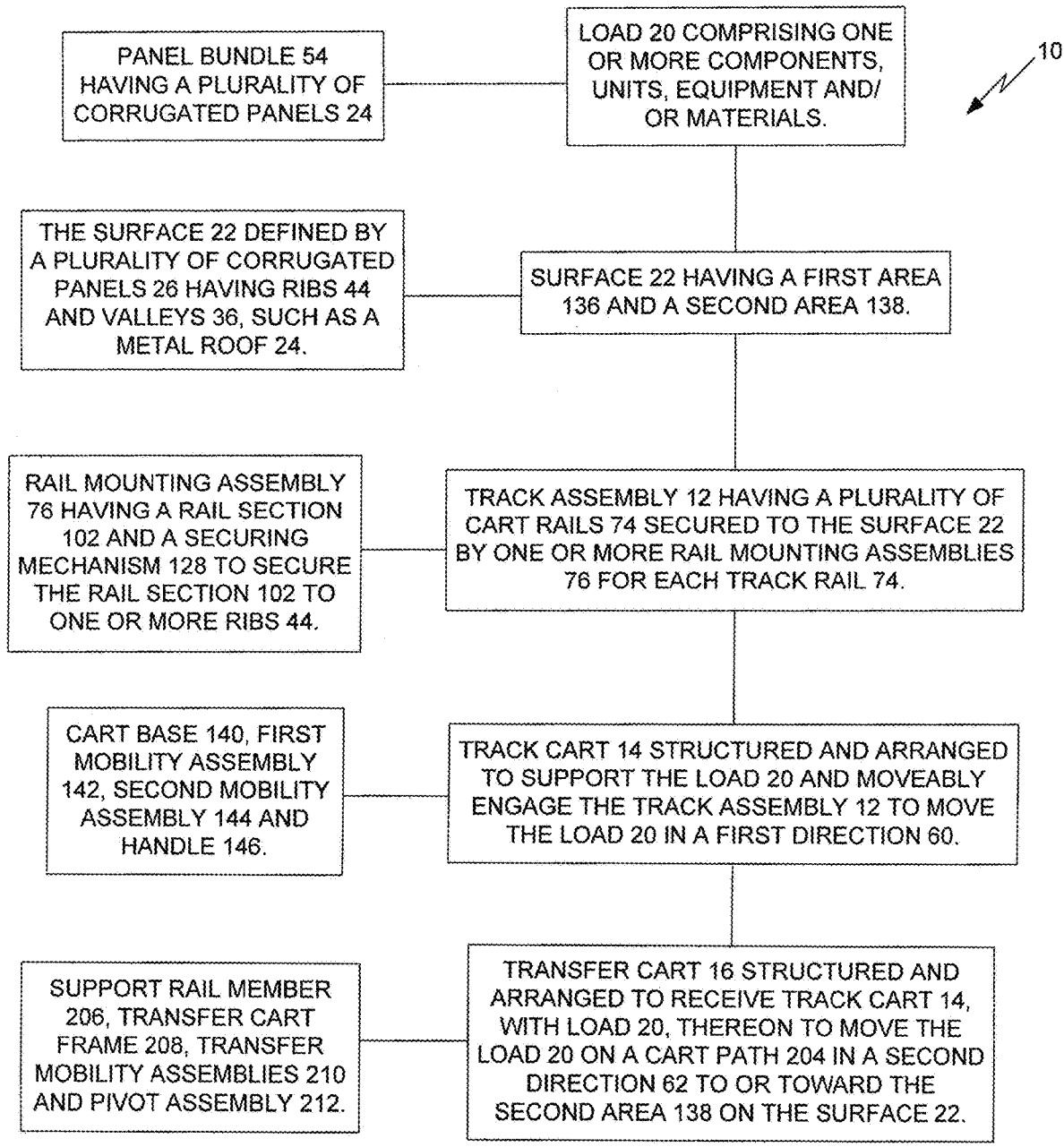
FIG. 21 is a chart showing a preferred embodiment of the system of the present invention.
Figure 22:
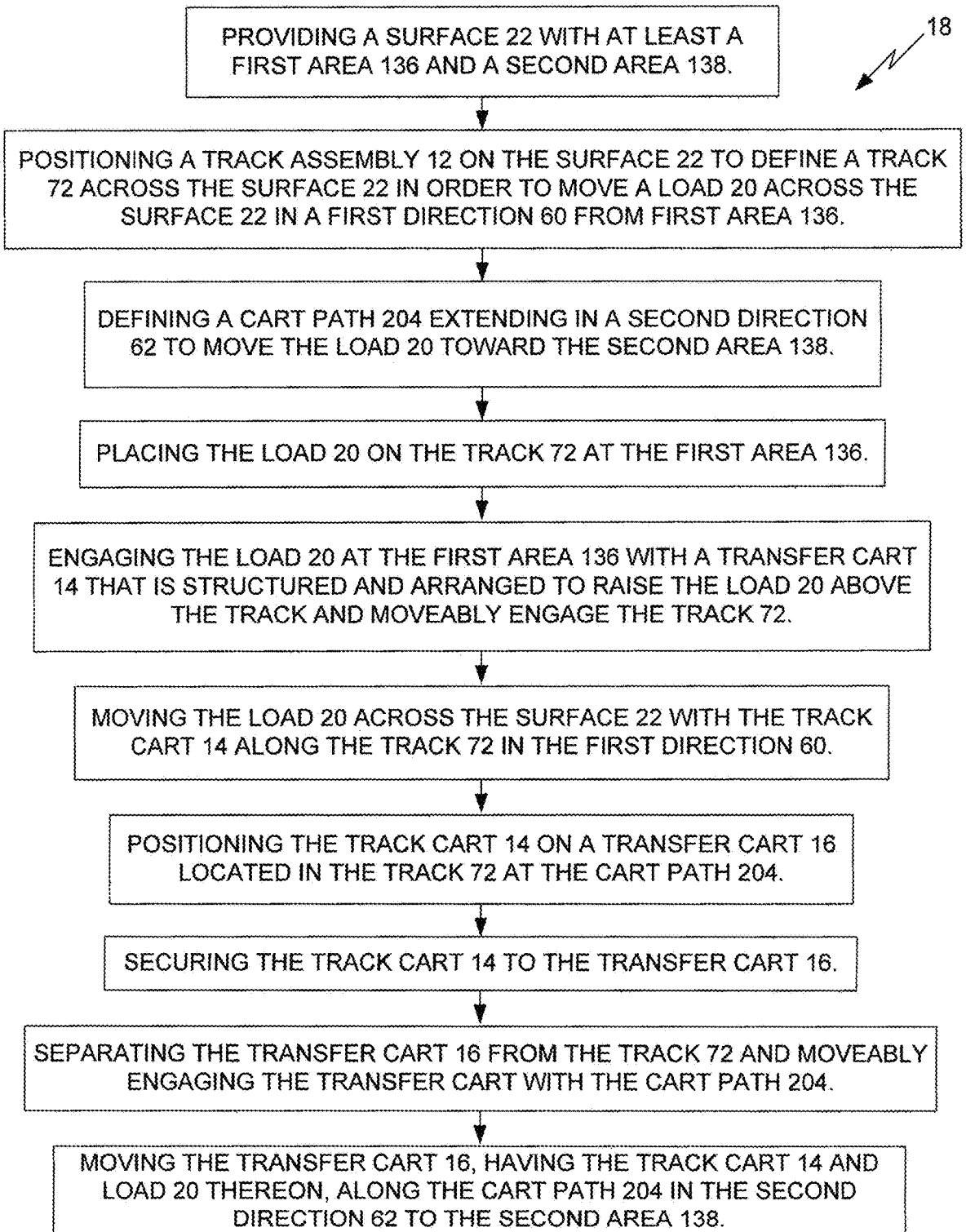
FIG. 22 is a flow chart summarizing a preferred embodiment of the method of the present invention.

A material transfer system that is configured pursuant to one of the preferred embodiments of the present invention is shown generally as 10 in FIGS. 6 and 21. A track assembly which is configured pursuant to one of the preferred embodiments of the present invention for use with the material transfer system 10 is shown generally as 12 in FIGS. 3-6. A track cart that is configured pursuant to one of the preferred embodiments of the present invention for use with the material transfer system 10 on the track assembly 12 is shown generally as 14 in FIGS. 4-6 and 12. A transfer cart which is configured pursuant to one of the preferred embodiments of the present invention for use with the material transfer system 10 is shown generally as 16 in FIGS. 6 and 18-20. A material transfer method that is configured pursuant to one of the preferred embodiments of the present invention is shown as 18 in the flow chart of FIG. 22. As set forth in more detail below, the new system 10 and method 18 utilize the track assembly 12, track cart 14 and transfer cart 16 to quickly and more efficiently and safely move a load 20 across a surface 22, as best shown in FIGS. 5-6 and summarized in the method chart of 21. In the preferred configurations of the present invention, the new track assembly 12, track cart 14 and transfer cart 16 are structured and arranged to be utilized to easily move a wide variety of loads 20, comprising one or more items, components, materials or the like, across a wide variety of different types of surfaces 22 in a manner which significantly reduces the amount of effort and time that would otherwise be required to move the load 20 across the surface 22, particularly loads 20 and surfaces 22 which would require the items, components or materials to be moved one at a time.

As set forth above, the present invention can be utilized to move a load 20 across a wide variety of surfaces. In one embodiment, the surface 22 can be a planar surface which is modified to accommodate the various features of the apparatuses of the present invention. In the figures, the surface 22 is shown as a metal roof 24 having a plurality of metal roof panels 26 that are attached to the frame or superstructure 27 for a building 28 (having walls 29), with the roof panels 26 forming a non-planar surface 22 on which a load 20 is to be moved, as best shown in FIGS. 1-2 and 4-6. In one configuration of the present invention, the new system 10, track assembly 12, track cart 14, transfer cart 16 and method 18 are specially structured and arranged to be utilized to move a load 20 across a metal roof 24, as the surface 22, that is define by a plurality of corrugated metal roof panels 26, with prior art examples of a metal roof 24, roof panels 26 and building 28 being shown in FIGS. 1 and 2. As well known to persons who are skilled in the relevant art, the roof panels 26 of a metal roof 24 are typically placed in interlocking arrangement with each other and are secured to the frame or superstructure 27 of the building 28.

Figure 1:
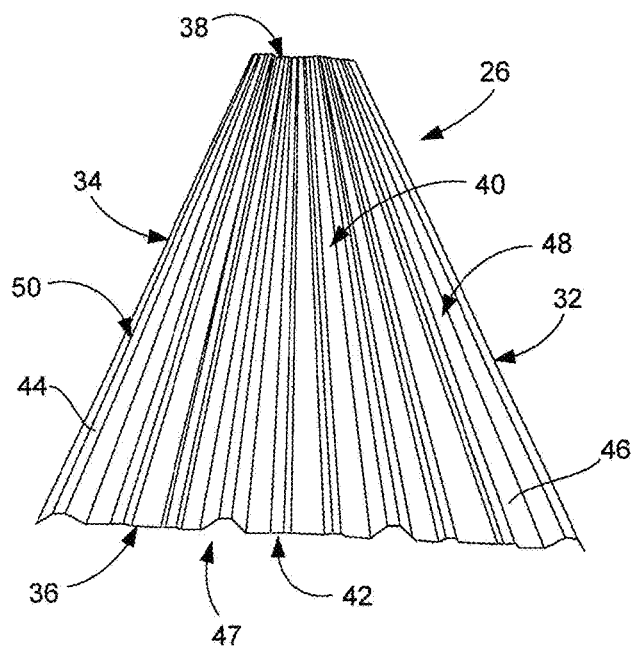
FIG. 1 is an end perspective view of a prior art roof panel of the type that is commonly utilized as the exterior cladding for a metal roof.
Figure 2:
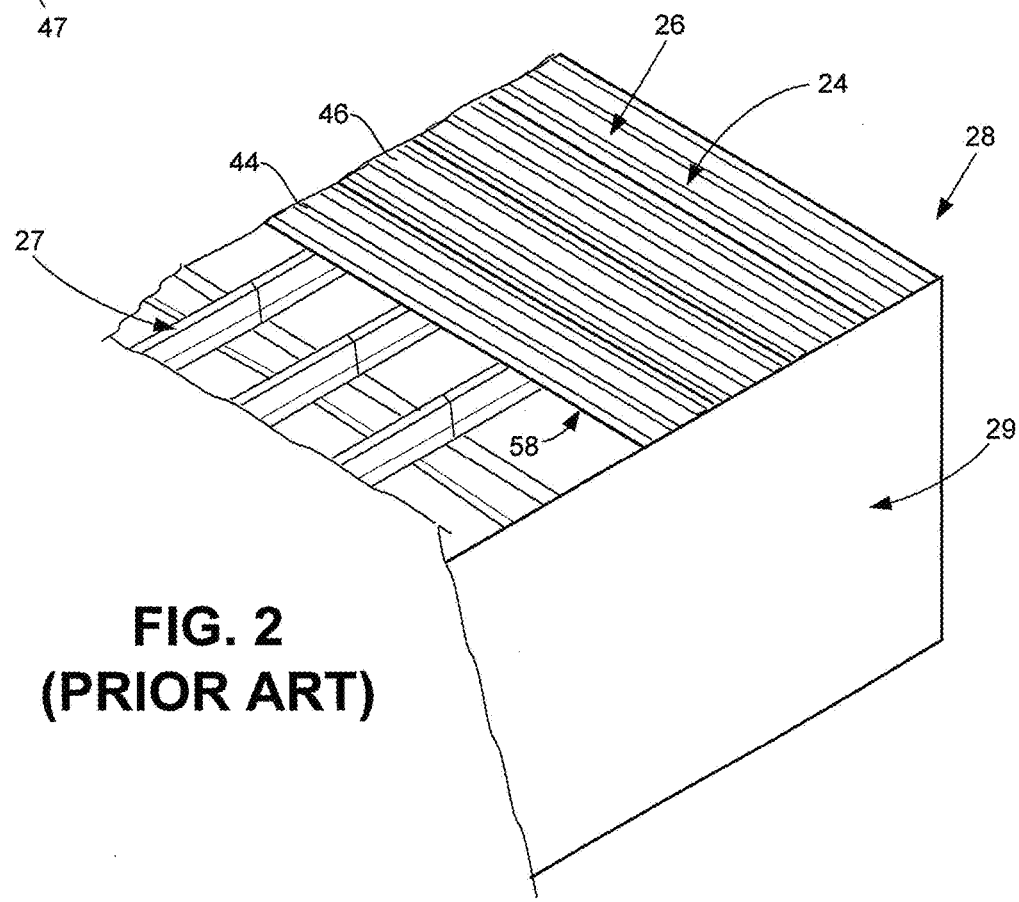
FIG. 2 is a side perspective view of a prior art building having a roof formed from a plurality of corrugated metal panels of the type shown in FIG. 1.

With regard to the present invention, a wide variety of different types, sizes and configurations of roof panels 26 can be utilized to form the metal roof 24 over which the load 20 will be moved. An example of one type of prior art panel 26 that can be utilized with the present invention is shown in FIG. 1. Each panel 26 has a panel body 30 with a first side 32, second side 34, first end 36 and second end 38 that define the dimensions of the panel 26. The panel body 30 also has an upper or outward facing surface 40 and a lower or inward facing surface 42. When installed on a building 28, the panel 26 is positioned such that the inward surface 42 is placed against, directly or indirectly, the frame 27 of the building 28 to face in toward the interior of the building 28 with the outward surface 40 facing outward to define the exterior surface of the metal roof 24, as shown in FIG. 2. As will be readily appreciated by persons skilled in the relevant art, the present invention is not limited to any type or size of panel 26 that is referenced or set forth herein. Instead, as will be readily appreciated by persons who are skilled in the art, the new material transport system 10 and method 18 of the present invention, using the track assembly 12, track cart 14 and transfer cart 16, can be utilized with a wide range of panels 26 to form the surface 22 over which the load 20 can be easily, quickly, efficiently and safely moved.

Most metal panels 26 which are utilized for the cladding that forms the metal roof 24 of a building 28 comprise a corrugated steel sheet having a plurality of spaced apart and parallel and alternating ribs 44 and valleys 46, as shown in FIGS. 1 and 6. Although the exact rib/valley configuration (i.e., the shape and size) of a panel 26 that can be utilized for the surface 22 can vary considerably among the many manufacturers of corrugated panels 26, the valleys 46 are generally flat to form a lower plane formed through the lower surface 48 of the valleys 46 that is in spaced apart relation from a top plane formed by through the top surface 50 of the ribs 44. The corrugations of a panel 26 are described in terms of pitch and depth, with the pitch being the distance between the top surface 50 (or crest) of two adjacent ribs 44 and the depth being the distance between the top surface 50 of a rib 44 to the bottom surface 48 of the adjacent valley 46. For a particular panel configuration, it is important for the pitch and depth to be uniform from one panel 26 to another in order for the panels 26 to be stackable for ease of transport and in order for the two adjoining panels 26 to be able to neatly overlap at their sides when joining the two panels 26 together. The uniform configuration for a particular type of panel 26 is identified herein as the panel profile 52, which for the panel 26 shown in FIG. 1 is the profile of ribs 44 and valleys 46 that is the same from one panel 26 to another panel 26 for that panel configuration. The panels 26 that can be utilized with the material transfer system 10, track assembly 12, track cart 16 and method 18 of the present invention can be, among others, of the type that are commonly known as exposed fastener, concealed fastener or standing seam panel installations, as well as any other types of panels 26.

Figure 3:
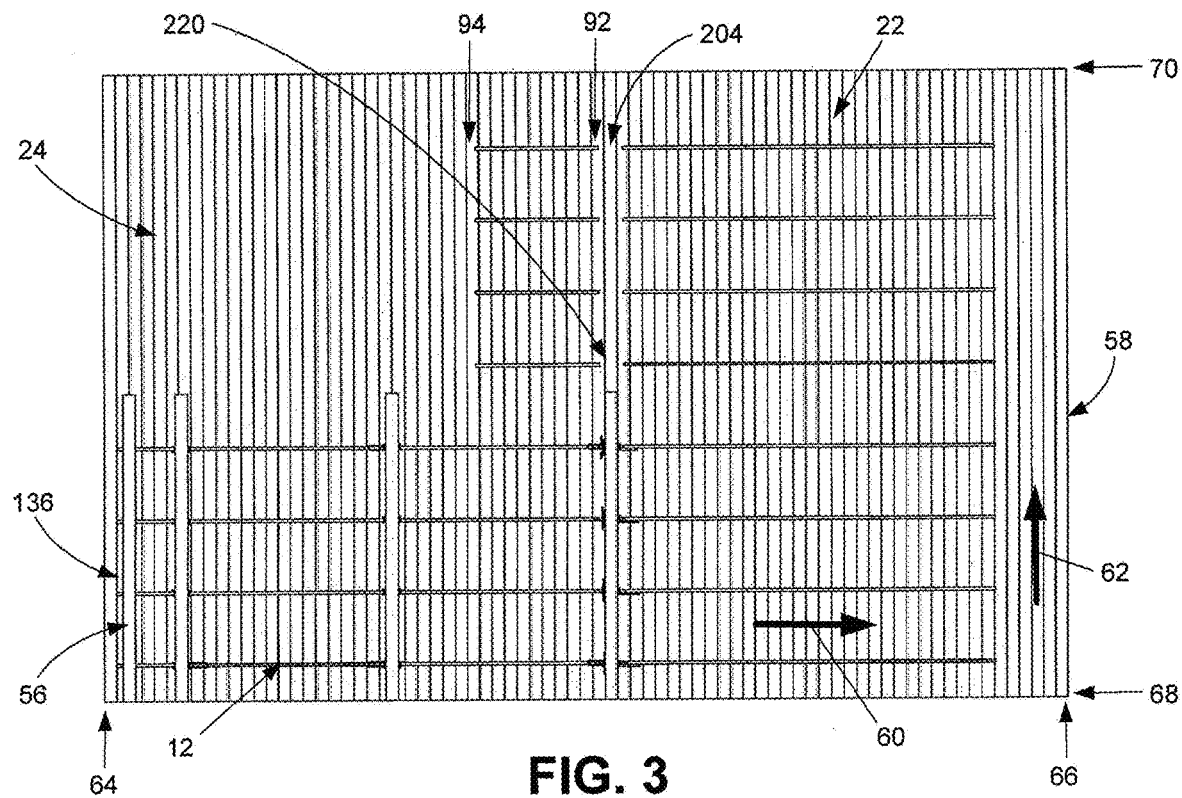
FIG. 3 is a top view of the surface of a roof formed from a plurality of corrugated metal panels of the type shown in FIG. 1 showing a staging area and a track, defined by a plurality of cart rails, positioned on the metal roof to achieve the objectives of the system and method of the present invention.
Figure 4:
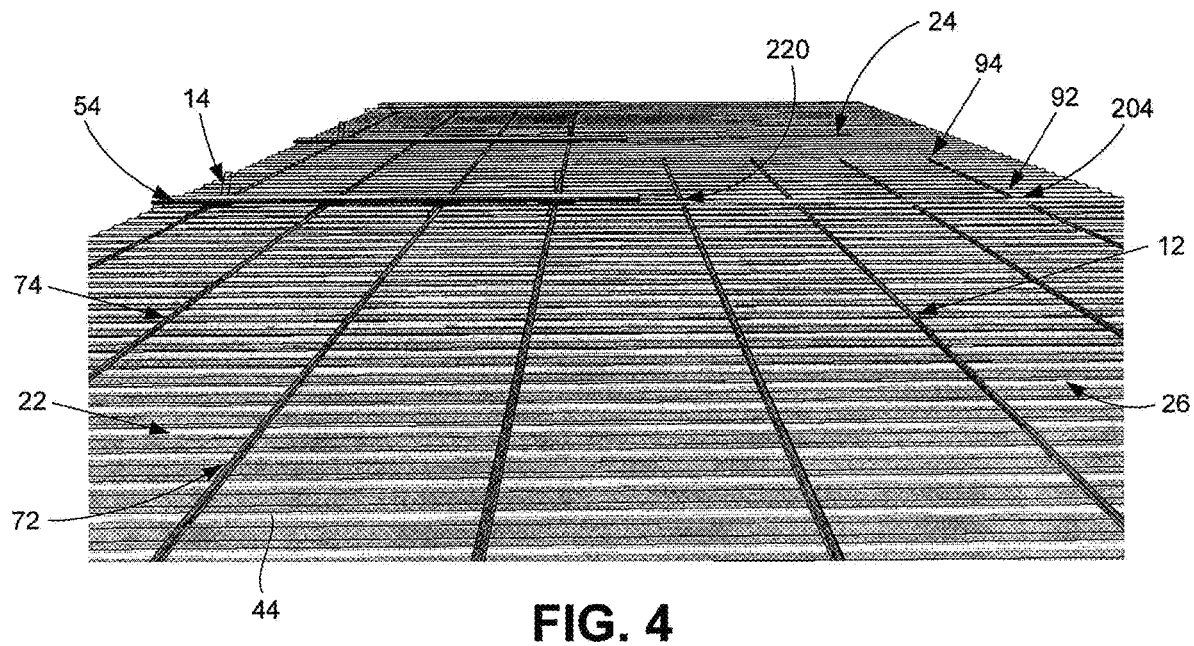
FIG. 4 is a top perspective view of the roof and cart rails of FIG. 3 shown in use with pairs of track carts to move a bundle of metal panels, as the load, from the staging area toward the leading edge of the roof.

Most often, panels 26 are delivered to a location where the panels 26 will be utilized in bulk, which are usually referred to as a panel bundle 54, as shown in FIGS. 4-6. With regard to metal roof installations, one or more panel bundles 54 are commonly placed on a portion of the metal roof 24 that is designated as a staging area 56, as shown in FIG. 3 with regard to the present invention. As well known in the relevant art and described above, prior to the present invention the workers generally move one panel 26 at a time from the panel bundle 54 at the staging area 56 to the leading edge 58 of the previously installed panels 26, which is where the new panels 26 will be installed. This requires the workers to walk back and forth between the staging area 56 and the leading edge 58 many times during the installation of the metal roof 24, which is well known to be an inefficient use of expensive labor and a major impact on the cost of installing the metal roof 24. As also well known, insulation and other materials that will be used for the metal roof 24 are also positioned at the staging area 56 and moved to a position on the surface 22 at or near where the items, components, materials or the like will be utilized or installed. To reduce the need for the workers to walk back and forth so much, new staging areas 56 are often created as the leading edge 56 moves across the length of the building 28 for placement of materials thereon, including panel bundles 54. As well known to persons skilled in the art, however, additional staging areas 56 on a metal roof 24 typically require use of a crane or other machine to place the panel bundles 24 at the additional staging areas 56, which can be quite expensive and cause delays if the timing is not carefully selected.

As set forth below, the material transport system 10 and method 18 of the present invention, using the new track assembly 12, track cart 14 and transfer cart 16, solves the problem of the workers having to walk back and forth across the metal roof 24 between the staging area 56 and the leading edge 58 as the workers move one panel 26 at a time. The present invention allows workers to easily and safely move an entire panel bundle 54 (as the load 20) to a location at or near the leading edge 58 where individual panels 26 can be removed from panel bundle 54 for installation at the leading edge 58 without requiring any significant movement across the metal roof 24. As will be readily appreciated by persons who are skilled in the art, use of the present invention will substantially reduce the amount of time workers spend moving panels 26 and will lower the cost of labor for forming a new metal roof 24. In addition, the user's placement and movement of a wide variety of other items, components, materials and the like, as the load 20, will benefit from the material transport system 10 and method 18 of the present invention, using the new track assembly 12, track cart 14 and transfer cart 16. As set forth above, the term load 20 includes one or more panels 26, a panel bundle 54, insulation materials and the like. In addition, large single items (also as load 20), such as a heating/cooling unit and the like, can be placed at the staging area 56 and then easily and safely moved to the location on the surface 22, such as a metal roof 24, where the item needs to be positioned using the present invention. As such, the description set forth herein and the drawings included herewith are merely provided as exemplary uses of the material transport system 10 and method 18 of the present invention, using the new track assembly 12, track cart 14 and transfer cart 16. Specifically, the present invention is not limited to use with panels 26 or panel bundle 54 as the material 20 and a metal roof 24, formed from roof panels 26, as the surface 22.

As set forth in FIGS. 6 and 21, the new material transport system 10 generally a surface 22 on which load 20 is to be moved, a track assembly 12 placed on or otherwise associated with the surface 22, a track cart 14 structured and arranged to engage the load 20 and move the load 20 on the track assembly 12 in a first direction 60 on the surface 22 and a transfer cart 16 that is structured and arranged to receive the track cart 14 thereon to move the track cart 14 and the load 20 on the surface 22 in a second direction 62, which second direction 62 is different than the first direction 60. In the embodiment described below and shown in the figures, the load 20 is a panel bundle 54, the surface 22 is a metal roof 24 comprising a plurality of corrugated roof panels 26, the first direction 60 is left to right in FIG. 3 (i.e., from the staging area 56 to the leading edge 58, also shown as a first end 64 and second end 66 of the surface 22 such that the second end 66 is the leading edge 58) and the second direction 62 is between the bottom and top of the drawing in FIG. 3 (i.e., in a direction between the first side 68 and the second side 70 of the roof 24), which can be from the eave/fascia to the ridge/peak of a sloped roof or between sides of a flat roof. As will be readily appreciated by persons who are skilled in the relevant art, other items, components, materials and the like can be or comprise the load 20 and the surface 22 can be the ground, floor, road or the like and/or the surface 22 can be planar or non-planar (i.e., ribbed from the ribs 44 of the panels 26). In addition, although the first direction 60 and second direction 62 are shown as perpendicular in the figures, persons who are skilled in the art will readily appreciate that being perpendicular is not necessary or required for the present invention. As such persons will readily understand, the second direction 62 can be at an angle relative to the first direction 60. In addition, although the use of the present invention on a non-planar surface 22, such as the ribbed surface formed by the panels 26, has certain benefits with regard to movement of the load 20 in the second direction 62 by the transfer cart 16 being cooperatively configured therewith to move on upwardly extending ribs (as described below), such as the ribs 44 of the panels 26, the surface 22 can be planar and the transfer cart 16 can be configured to move a load 20 over the planar surface 22 in the second direction 62. In certain embodiments, the transfer cart 16 can be configured to move over ribs or rails set into the surface 22 at or below the level of the surface 22.

Figure 11:
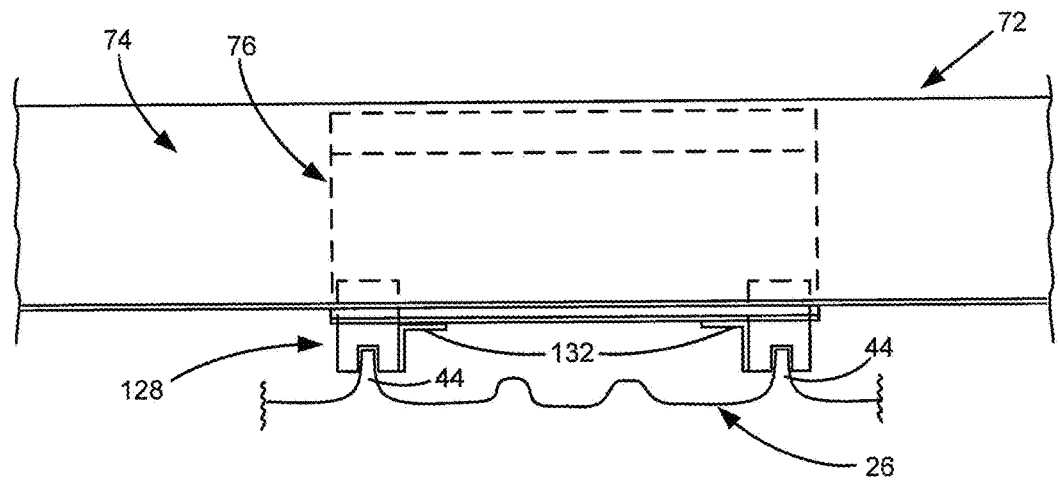
FIG. 11 is a side view of the cart rail of FIG. 7 positioned on the rail mounting assembly of FIG. 8, which is shown attached to the ribs of a corrugated panel.

As set forth above, the track assembly 12 is placed on the surface 22 to define a track 72 for the track cart 14 on which the track cart 14 will moveably engage to move the load 20 across surface 22. In the embodiment shown in the figures, the track assembly 12 is placed across the top surface 50 of the ribs 44 of the roof panels 26, as best shown in FIGS. 5-6. The track 72 for the track cart 14 is formed by a cart rail 74 which is held in place on the top surface 50 of the ribs 44 of the roof panels 26 (as the surface 22) by a rail mounting assembly 76, as shown in FIGS. 3-6 and 11. In a preferred configuration, the rail mounting assembly 76 is structured and arranged to securely engage a rib 44 of a roof panel 26 and the cart rail 74 is cooperatively sized and configured to be positioned on top of the rail mounting assembly 76 and removably engage the rail mounting assembly 76 to create the track 72 across the surface 22 which will be traversed by the track cart 14 when moving the load 20, as shown in FIGS. 4-5 and 11.

Figure 7:
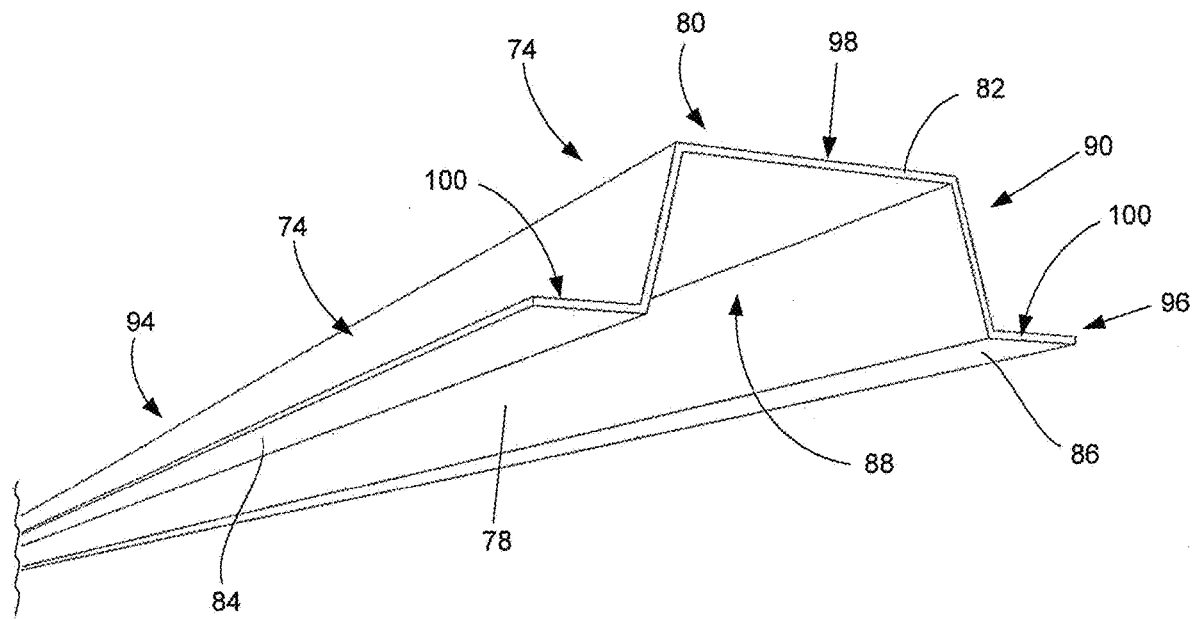
FIG. 7 is an end perspective view of one of the cart rails that are utilized to form the track of FIGS. 3 through 6.
Figure 10:
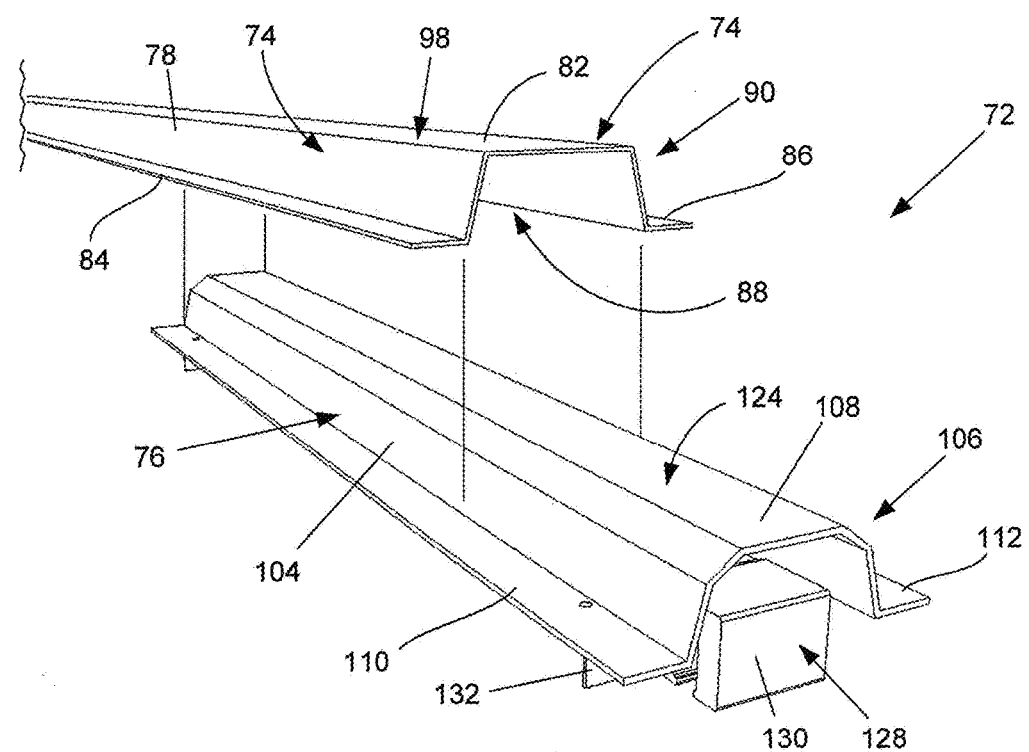
FIG. 10 is a top perspective view of the cart rail of FIG. 7 shown positioned generally above the rail mounting assembly shown in FIG. 8.

The cart rail 74 comprises an elongated rail body 78 that is shaped and configured with a rail profile 80, shown in FIG. 7, which allows the cart rail 74 to be engagedly placed on the rail mounting assembly 76 and to support the track cart 14 as it moves the load 20 across the surface 22, as show in FIGS. 4-6. In the embodiment shown in the figures, the cart rail 74 has a rail profile 80 which is configured with an upwardly extending, generally upside down U-shaped center section 82 and a pair of laterally outwardly extending side members, shown as first side member 84 and second side member 86, that define an open area 88 under the center section 82, as shown in FIGS. 7 and 10. The elongated rail body 78 of cart rail 74 has a first end 90, a second end 92, first side 94 and second side 96, as shown in FIGS. 3-4, 7 and 10. As set forth in more detail below, the cart rail 74 has a mobility assembly which is configured to roll along and engage components of the cart rail 74. As best shown in FIGS. 7 and 10, the rail profile 80 is such that the center section 82 has a generally planar upwardly facing surface 98. In the present embodiment, the center section 82 is cooperatively sized and configured (i.e., the width and height thereof) with the mobility assembly of the track cart 14 to allow the track cart 14 to move along the track 72 formed by the cart rail 74 being moveably engaged by the rolling components (such as a roller wheel or the like) of the track cart 14 as track cart 14 moves the load 20 across surface 22 in the first direction 60. As also shown in FIGS. 7 and 10, each of the side members 84/86 also define generally planar upwardly facing surfaces 100 that, depending on the configuration of the track cart 14, can also be engaged by the track cart 14 to allow the track cart 14 to move across surface 22. As will be readily appreciated by persons skilled in the art, although the surfaces 98 and 100 are shown as being flat, these surfaces 98 and 100 can have any configuration which beneficially allows the track cart 14 to move along the track 72 defined by the track rail 74. For instance, in an alternative configuration, the center section 82 and/or side members 84/86 can have angled or peaked surfaces 98/100 that will be moveably engaged by one or more V-shaped rollers associated with the track cart 14. As will be readily appreciated by persons who are skilled in the relevant art, a wide variety of different configurations are possible for the track rail 74, as long as the track 72 defined thereby in cooperative relation with the track cart 14 so the track cart 14 can move along the track 72 in the first direction 60 while the track cart 14 is moveably supporting the load 20 that is being moved across the surface 22.

Figure 8:
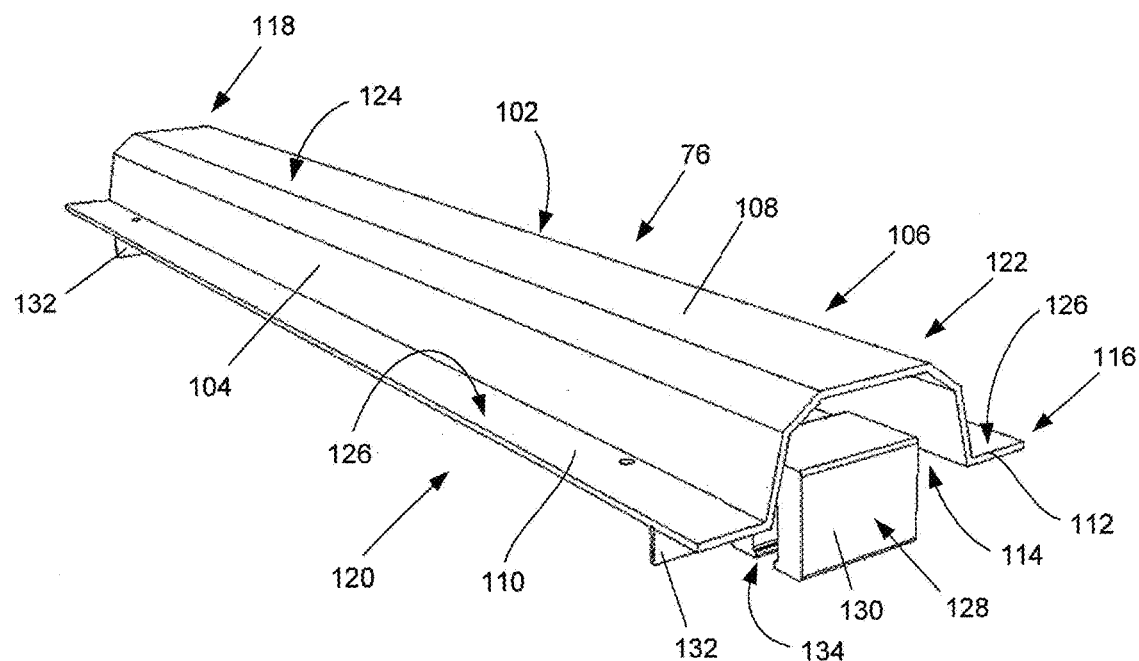
FIG. 8 is an end view of a rail mounting assembly that is utilized to hold the cart rail of FIG. 7 in place on a corrugated metal panel of the metal roof of FIG. 6 to form the track that is utilized by the track cart.
Figure 9:
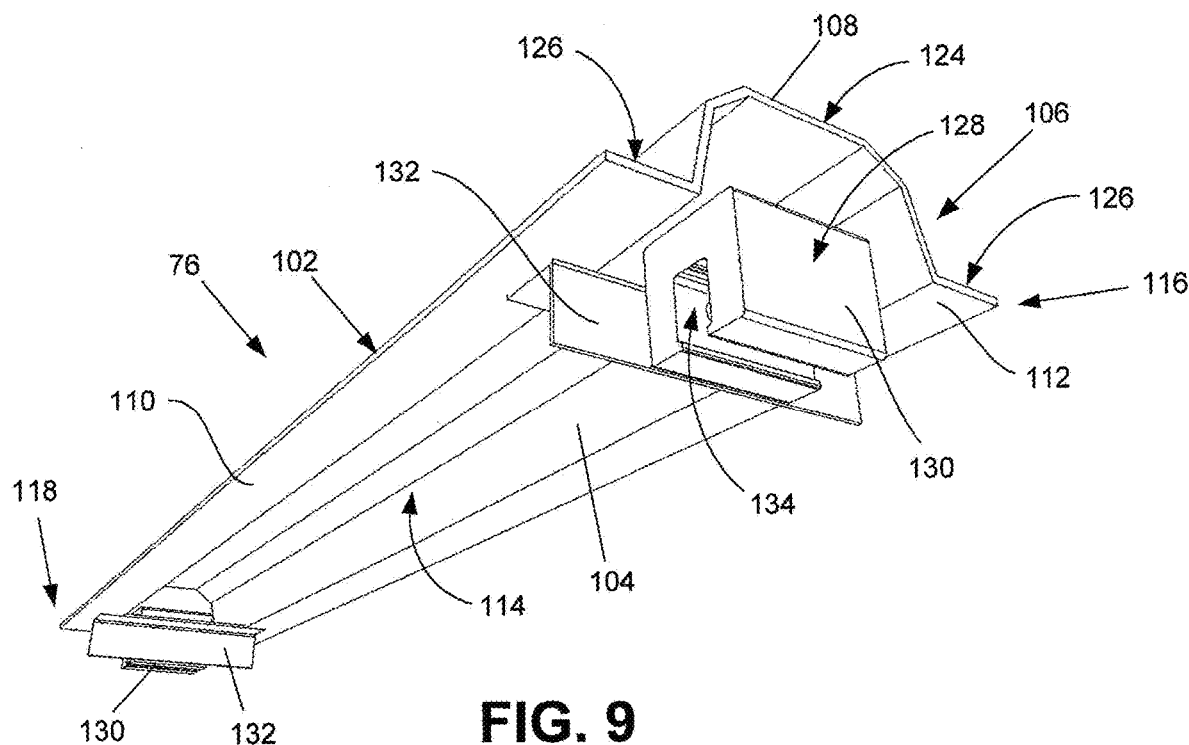
FIG. 9 is a bottom perspective view of the rail mounting assembly of FIG. 8 showing the mounting components thereof, which are configured to be removably mounted on a rib of a corrugated metal panel, such as those shown in FIGS. 1-6.

The rail mounting assembly 76 comprises rail section 102 having an elongated mount body 104 that is shaped and configured with a mount profile 106, shown in FIGS. 8-9, which is cooperatively configured with the rail cart 74 to allow the cart rail 74 to be engagedly placed over the rail mounting assembly 76 to support the track 72 as the track cart 14 moves the load 20 across the surface 22, as show in FIGS. 4-6 and 11. In the embodiment shown in the figures, the mount body 104 of the rail section 102 has a mount profile 106 which is configured with an upwardly extending, generally upside down U-shaped center section 108 and a pair of laterally outwardly extending side members, shown as first side member 110 and second side member 112, that define an open area 114 under the center section 108, as shown in FIGS. 8-10. The elongated mount body 102 of rail section 102 of the rail mounting assembly 76 has a first end 116, a second end 118, first side 120 and second side 122, as shown in FIGS. 8-10. As best shown in FIGS. 8 and 10, the mount profile 108 is such that the center section 108 has a generally planar upwardly facing surface 124 and each of the side members 110/112 have an upwardly facing surface 126. In the present embodiment, the center section 108 of the rail section 102 of the rail mounting assembly 76 is cooperatively sized and configured (i.e., the width and height thereof) with the center section 82 of the cart rail 74 to allow the cart rail 74 to be placed on top of the mount body 104 of the rail section 102, as shown in FIG. 11, in a manner which holds the cart rail 74 in place as the track cart 14 moves along track 72. As will be readily appreciated by persons skilled in the art, although the surfaces 124 and 126 are shown as being flat, these surfaces 124/126 can have any configuration which beneficially allows the track cart 14 to be placed on top of and secured in place by the rail section 102 of the rail mounting assembly 76.

For the embodiment shown in the figures, when the cart rail 74 is placed over and in engaged relationship with the rail mounting assembly 76, as shown in FIG. 11, the center section 82 of cart rail 74 will be in adjacent relation with the center section 108 of rail section 102 and the side members 84/86 of the cart rail 74 will be in adjacent relation with the side members 110/112 of the rail section 102. As will be readily appreciated by persons who are skilled in the art, with the cart rail 74 and rail section 102 being cooperatively sized and configured, cart rail 74 can be positioned on top of and held in place on the surface 22 by the rail section 102 of the rail mounting assembly 76 simply by placing the cart rail 74 over the rail section 102. The length of the mount body 104 of the rail section 102 can be substantially less than the length of the rail body 78 of the cart rail 74. In use, the user will position a plurality of rail mounting assemblies 76 across the surface 22, with each rail mounting assembly 76 in spaced apart relation to each other, but close enough (in a preferred use) that one cart rail 74 will be positioned over at least one rail mounting assembly 76.

To prevent movement of the cart rails 74 as the track cart 14 is moved along the track 72, it is important to attach the track 72 to the surface 22. In one embodiment of the present invention, this is accomplished by securing the rail section 102 of the rail mounting assembly 76 to the surface 22. For use with a surface 22 defined by a plurality of corrugated panels 26 having ribs 44 and valleys 46, the rail mounting assembly 76 can be removably, but securely, attached to the surface 22 by attaching the rail section 102 of the rail mounting assembly 76 to one or more, preferably at least two, ribs 44 of the panels 26 that form the metal roof 24 (as surface 22). The necessary attachment can be accomplished by a securing mechanism 128 that is positioned in the open area 114 of the rail section 102, as best shown in FIGS. 8-10. In the embodiment shown in the figures, the securing mechanism 128 of the rail mounting assembly 76 comprises a clamp 130 held in place by a bracket 132, such as an L-shaped bracket, that is secured to or integrally formed with the mount body 104, such as the side members 110/112, of the rail section 102, as best shown in FIG. 9. In one embodiment, the clamp 130 is of the type that have a clamp opening 134 sized and configured to receive a rib 44 of a panel 26 therein, as shown in FIG. 11, and which are specially configured to engagedly clamp onto the rib 44 of panel 26, such as those which are commonly utilized to install solar panel supports and the like onto a metal roof 24. One example of such clamps 132 are the S-5!® clamps available from Metal Roof Innovations, Ltd., which are configured to be securely attached to an upwardly extending member, such as rib 44, in a manner that does not penetrate the rib 44. The configuration of the cart rail 74 and rail mounting assembly 76 have been found to be relatively easy to use and quick to set-up and remove to define a secure track 72 across the surface 22. As will be readily appreciated by persons who are skilled in the relevant art, a variety of other types of clamping mechanisms 128 can be utilized for rail mounting assembly 76 of the present invention to securely, but removably, attach the rail section 102 of the rail mounting assembly 76 to a rib 44 of a metal roof panel 26. Once the rail mounting assembly 76 is in place by the clamping mechanism 128 being clamped to one or more ribs 44 of a panel 26, the cart rail 74 can be placed over one or more rail mounting assemblies 76 to define the track 72 that can be moveably engaged by the rolling components (i.e., a roller wheel) of the track cart 14 as the track cart 14 moves the load 20 across the surface 22.

The track cart 14, shown in FIGS. 12-17, is structured and arranged to moveably engage the track 72 to allow the user to move the load 20 across the surface 22. In one of the preferred embodiments, the track cart 14 is structured and arranged to allow the user to manually move the load 20 along the track 72, such as defined by the cart rail 74 and the rail mounting assembly 76 described above. In other embodiments, the track cart 14 can be motorized and the material transfer system 10 can be configured to allow the user to controllably move the load 20 along the track 72 across surface 22. In one use of the present invention, the load 20 is placed directly on the track cart 14 when the load 20 is placed at a first area 136 on surface 22, such as the staging area 56, to allow the user to move the load 20 to a second area 138, such as at or near the leading edge 58 of the previously installed roof panels 26 on a metal roof 24. In a preferred configuration of the present invention, however, the track cart 14 and track 72 are cooperatively structured and arranged to allow the user to place the load 20 directly on the track 72 in the first area 136, position the track cart 14 under the load 20, lift the load 20 off of the track 72 and manually move the load 20 across the surface 22 to the second area 138. More specifically, in the preferred configurations of the present invention, the track cart 14 and the cart rail 74 are cooperatively structured and arranged to allow the user to place the load 20, such as a panel bundle 54, directly on the upwardly facing surface 98 of the center section 82 of the cart rail 74, slide portions of the track cart 14 along the sides of cart rail 74 to position the support section of the track cart 14 under the load 20, raise the load 20 off of the center section 82 of the cart rail 74 while moveably engaging the center section 82 and then pull or push the track cart 14 on cart rail 74 to move the load 20 across the surface 22 in a first direction 60. The various components and features of the new cart rail 14 to accomplish the above operation are described below.

Figure 12:
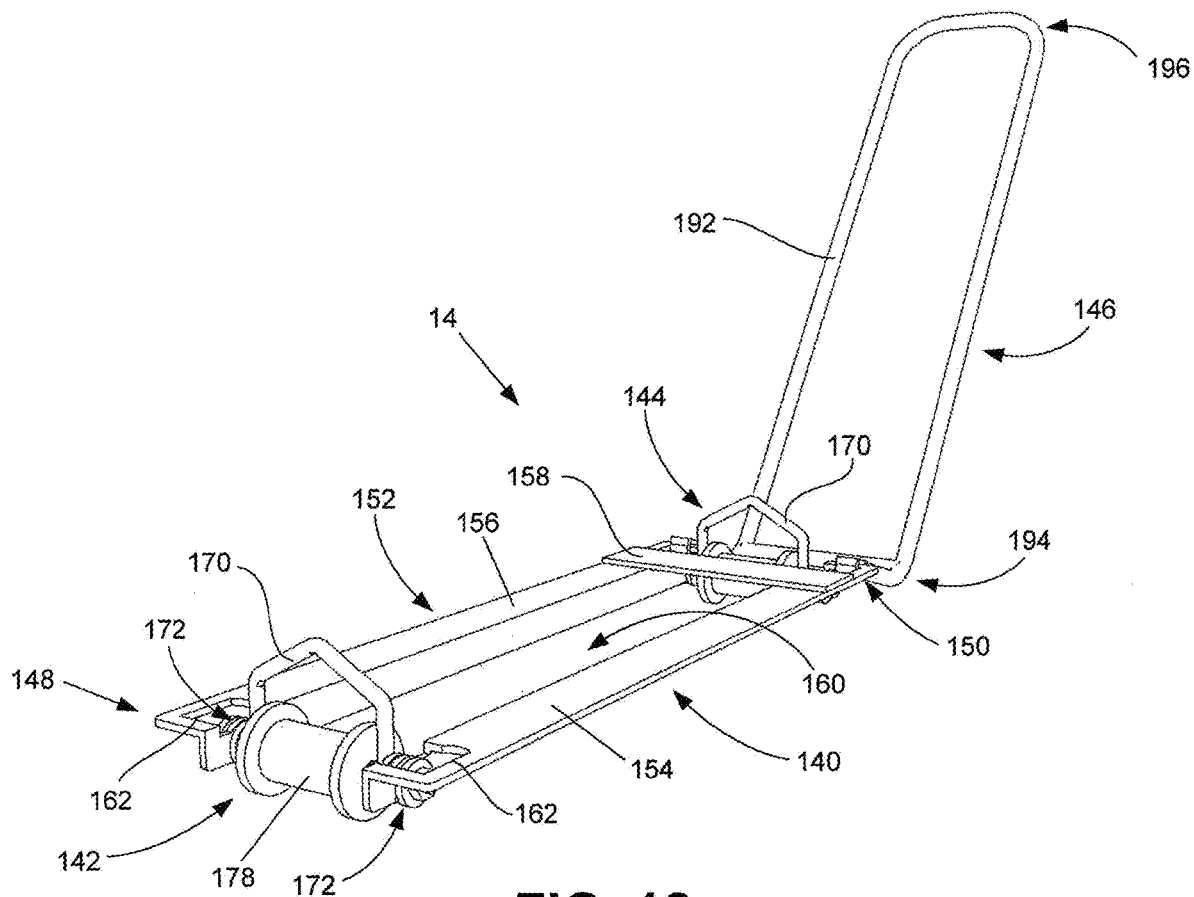
FIG. 12 is an end perspective view of the first end of one of the track carts of FIG. 5 shown separate from the roof, cart rails and bulk load of metal panels.
Figure 13:
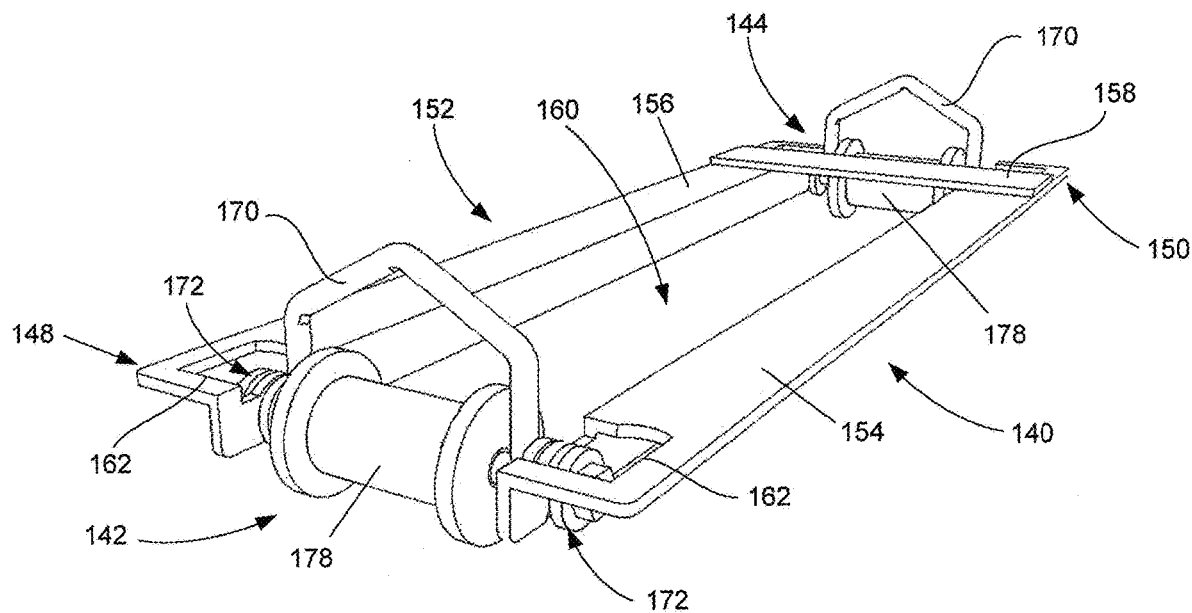
FIG. 13 is an end perspective view of the first end of the track cart of FIG. 12 shown without its handle.

A track cart 14 configured for use with material transfer system 10 of the present invention generally comprises a cart base 140, a pair of track engaging mobility assemblies, shown as first mobility assembly 142 and second mobility assembly 144, and a handle 146, as best shown in FIG. 12. As shown in FIGS. 12-13, the first mobility assembly 142 is located at the first end 148 of the cart base 140 and the second mobility assembly 144 is located at the second end 150 of the cart base 140 to define a support section 152 between the two wheel assemblies 142/144. The handle 146 is shown at the second end 150 of the cart base 140 in FIG. 12 and separately in FIGS. 16-17. As set forth in more detail below, when the load 20 is sitting on the center section 82 of rail body 78 of cart rail 74, the support section 152 of the cart base 140 is positioned under the load 20 and, using the specially configured handle 146, the support section 152 and load 20 thereon are pivoted upward so the two mobility assemblies 142/144 can be attached, one at a time, to the respective ends 148/150 of the cart base 140 to moveably engage the track 72. Although he user can push or pull the load 20 across surface 22 by pushing or pulling directly on the load 20 or the track cart 14 if he or she desires, in a preferred configuration the user will attach the handle 146 to one end 148/150 of the cart base 140 to push or pull the track cart 14, with the load 20 thereon, along the track 72 across the surface 22.

Figure 14:
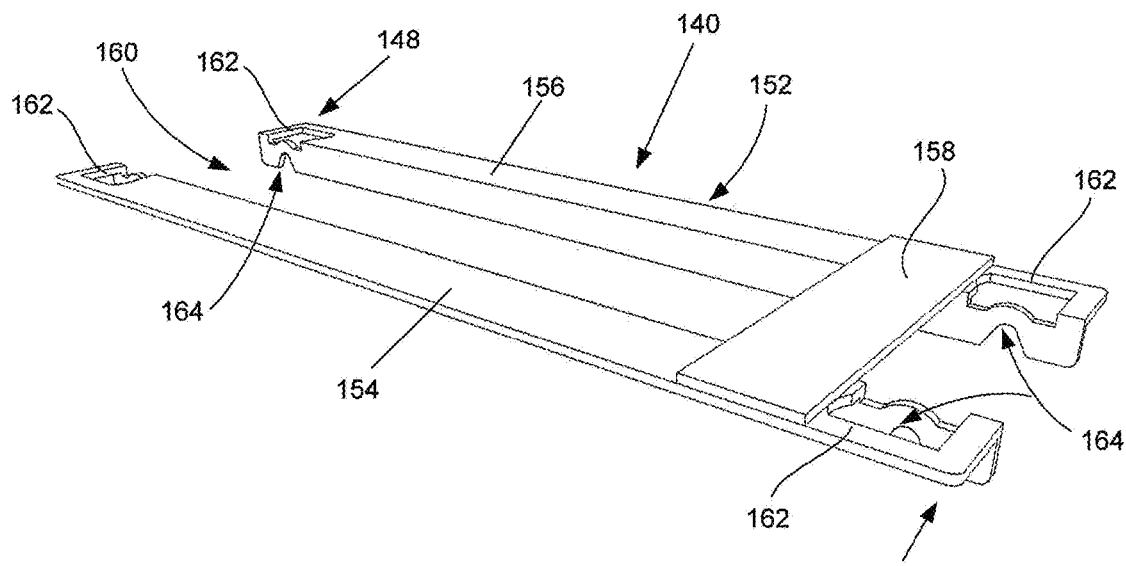
FIG. 14 is an end perspective view of the second end the cart base of the track cart of FIG. 13.

In a preferred embodiment of the present invention, the cart base 140 has a generally U-shaped configuration having an elongated first arm member 154, an elongated second arm member 156 and a laterally disposed cross-member 158 attached to or integrally formed with the arm members 154/156. The two arm members 154/156 are disposed in spaced apart relation to define an arm gap 160 therebetween, as best shown in FIGS. 12-14. Each of the arm members 154/156 have handle engaging slots 162 at the first end 148 and second end 150 of the cart base 140, best shown in FIGS. 12-14. The two handle engaging slots 162, which are typically located outside the support section 152, are sized and configured to be engaged by the handle 146 to help the user install the mobility assemblies 142/144 on the cart base 140 and use the handle 146 to manually push or pull the track cart 14 along the track 72, as shown in FIGS. 5-6. Associated with each handle engaging slot 162 is a mobility assembly mount 164, as best shown in FIG. 14. The mobility assembly mounts 164 are sized and configured to engage the respective mobility assemblies 142/144, as described below, in a manner that holds each mobility assembly 142/144 in place generally under the respective ends 148/150 of the cart base 140 to allow the track cart 14 to move along the track 72. In the embodiment shown in the figures, the mobility assembly mounts 164 are notches, as best shown in FIG. 14, that are each sized and configured to hold the mobility assemblies 142/144 in place on the center section 82 of the cart rail 74 which defines the track 72. As will be readily appreciated by persons who are skilled in the relevant art, various other configurations can be utilized for each of the mobility assembly mounts 164 as long as such mobility assembly mounts 164 are cooperatively sized configured with the mobility assemblies 142/144 so they will be held in place on the track 72.

The arm members 154/156 and cross-member 158 must be made out materials which are sufficient to support the anticipated weight of the load 20 as the load 20 is moved across the surface 22. The cross-member 158 can be integrally formed with one or both of the arm members 154/156 or attached to one or both arm members 154/156 by use of bolts, screws, rivets or other connectors or by welding, adhesives or other connecting methods that are appropriate for the materials from which the arm members 154/156 and cross-member 158 are manufactured. Although materials such as plastic, wood, fiberglass and other composites will be suitable to support certain loads 20, typically the components of the track cart 14 will be made out of steel or other metals.

In the embodiment shown in the figures, each mobility assembly 142/144, best shown in FIGS. 5, 12-13 and 15, comprises a removable roller wheel with an integral axle-hub assembly. More specifically, each mobility assembly 142/144 has a center-positioned, track engaging roller wheel 166, an elongated cylindrical-shaped axle 168 attached to or integral with the roller wheel 166 and sized to extend outwardly from the roller wheel 166, a mobility assembly handle 170 and a hub-like mobility mounting device 172 at or near each of the ends of the axle 168, namely at or near the first end 174 and second end 176, as best shown in FIG. 15. The roller wheel 166 is structured and arranged to engage and roll along the track 72. In the embodiment shown with the cart rail 74 defining the track 72, the roller wheel 166 is structured and arranged to roll along the upwardly disposed surface 98 of the center section 82 of the rail body 78 of cart rail 74. In the embodiment shown in the figures, the roller wheel 166 comprises an elongated cylindrical center section 178 that is bounded at its opposing ends by a first enlarged section 180 toward the first end 174 of the axle 168 and a second enlarged section 182 toward the second end 176 of axle 168. In this configuration, the length of the cylindrical center section 178 is slightly longer than the width of the center section 82 of the cart rail 74 to place the two enlarged sections 180 on either side of the center section 82 above the side members 84/86 of the rail body 78. In this manner, the roller wheel 166 will move along the cart rail 74 with the center section of the roller wheel 166 rolling on top of the center section 82 of the cart rail 74 and constrained thereon by the two enlarged sections 180/182 on the sides of the center section 82 to keep the track cart 14 on the track 72.

In the embodiment shown in the figures, the mobility mounting devices 172 are configured as hubs that freely rotate around the axle 168 and the mobility assembly handle 170 has an upside down U-shaped configuration that is fixedly attached to the mobility mounting devices 172 on either side of the roller wheel 166, as best shown in FIGS. 12-13 and 15. The hubs of the mobility mounting devices 172 comprise a tubular center portion 184 through which the axle 168 is received and an enlarged member on either side of the center portion 184, shown as inner enlarged member 186 and outer enlarged member 188, as best shown in FIG. 15. A nut or other connector 190 holds the hub-like mobility mounting devices 172 on the axle 168, at or near the ends 174/176 thereof. In use, the mobility mounting devices 172, which act as bearings, are sized and configured to be engaged and held in place on the track 72 by the cart base 140. More specifically, each of the mobility mounting devices 172 are cooperatively sized and configured to be engaged by the mobility assembly mounts 164 (i.e., notches in the arm members 154/156 at the slots 162), such that the notch of the mobility assembly mounts 164 will be on top of the center portion 184 of the hubs of the mobility assembly mounts 164 with the inner and outer enlarged members 186/188 on either side of the notch (mobility assembly mounts 164), as best shown in FIGS. 12-13. As set forth in more detail below, the user will utilize the mobility assembly handle 170 to position the first mobility assembly 142 at the first end 148 of the cart base 140 and the second mobility assembly 144 at the second end 150 of the cart base 140 with the center section 178 of each of the mobility assemblies 144/146 on the cart rail 74 with the mobility assembly mounts 164 of the cart rail 74 engaging the hub-like mobility mounting devices 172 of the mobility assemblies 142/144, as shown in FIG. 5.

As set forth above, the cart handle 146 is structured and arranged to assist with installing the mobility assemblies 144/146 by lifting the ends 148/150 of the cart base 140 upward to place the mobility assemblies 144/146 in position and to be utilized by the user to push or pull the track cart 14, with the load 20 thereon, across surface 22. The cart handle 146 has a handle body 192 with a first/lower end 194 and a second/upper end 196, with the first/lower end 194 structured and arranged to engage the handle engaging slots 162 of the cart base 140, as best shown in FIGS. 5, 12 and 16-17. The handle body 192 is configured to define a leverage section 198 that allows the user to utilize the cart handle 146 as a lever to raise the ends 148/150 of the cart base 140 to place the mobility assemblies 142/144 in place on the track 72 (i.e., between the cart base 140 and the center section 82 of the rail body 78). In the embodiment shown in the figures, the handle body 192 of cart handle 146 has an upside down U-shaped configuration and the leverage section 198 is upwardly angled and comprises a leverage bar 200 between the opposing U-shaped components of the handle body 192, as best shown in FIGS. 16-17. In the embodiment shown in these figures, the cart handle 146 is shaped somewhat similar to the body of a standard dolly and the first/lower end 194 of the handle body 192 has a pair of upwardly disposed, U-shaped or C-shaped engaging members 202 that are sized and configured to engage the handle engaging slots 162 at or near the ends 148/150 of the cart base 140, as shown in FIG. 12.

As will be readily appreciated by persons who are skilled in the art, the various components of the above-described track cart 14 can be replaced by a wide variety of differently configured components to achieve the same benefits and advantages of the track cart 14. For instance, each of the track engaging mobility assemblies 142/144 can be rollers, wheels and other mobility devices that are sized and configured to movably engage the track 72 to allow the track cart 14 to move in the first direction 60 across the surface 22. The configuration of any such mobility devices need to be structured and arranged to movably engage the track rails 74 that define the track 72. In the embodiment shown in the figures, a roller wheel 166 performs this function by engaging the generally planar upwardly disposed surface 98 of the center section 82, as best shown in FIG. 5. Other configurations of the rail body 78, namely those having a different rail profile 80 than that shown in the figures, may benefit from differently configured mobility devices other than the roller wheel 166. Such mobility devices will be selected to provide a substantially equivalent function, which is to move the track cart 14 across the track 72 on the surface 22 while the track cart 14 is supporting the load 20. Likewise, the configuration of the hub-like mobility mounting devices 172 may be configured differently and engage the cart base 140 differently depending on the configuration of the cart base 140 and the mobility assemblies 142/144. For instance, in certain configurations, the mobility assemblies 142/144 of the track cart 14 may be fixedly engaged with the cart base 140 or at least engaged in a manner that does not require the cart base 140 to be pivotally raised to receive the mobility assemblies 142/144.

As set forth above, the transfer cart 16, shown in FIGS. 6 and 18-20, is structured and arranged to receive the track cart 14, with the load 20 thereon, and move the track cart 14 and load 20 on the surface 22 in the second direction 62. In most circumstances, the transfer cart 16 is utilized to move the load 20 closer to where the items, components, materials and the like will be utilized and/or installed. In the embodiment shown in the figures, the transfer cart 16 moves the load 20 to or near the leading edge 58 of the metal roof 24, as formed by the previously installed roof panels 26, as shown in FIG. 3. As set forth in more detail below, the transfer cart 16 is structured and arranged to engage the surface 22 to move the load 20 along a transfer cart path 204 that is define by or on the surface 22, as shown in FIGS. 3-4. In the embodiment shown in the figures where surface 22 is a metal roof 24 comprising a plurality of corrugated roof panels 26 having ribs 44 and valleys 46, the cart path 204 is defined by a pair of ribs 44 of the panels 26 and the transfer cart 16 is structured and arranged to moveably engage and move on the pair of ribs 44 in the second direction 62 to the second area 138, as shown in FIGS. 6 and 18-20.

Figure 18:
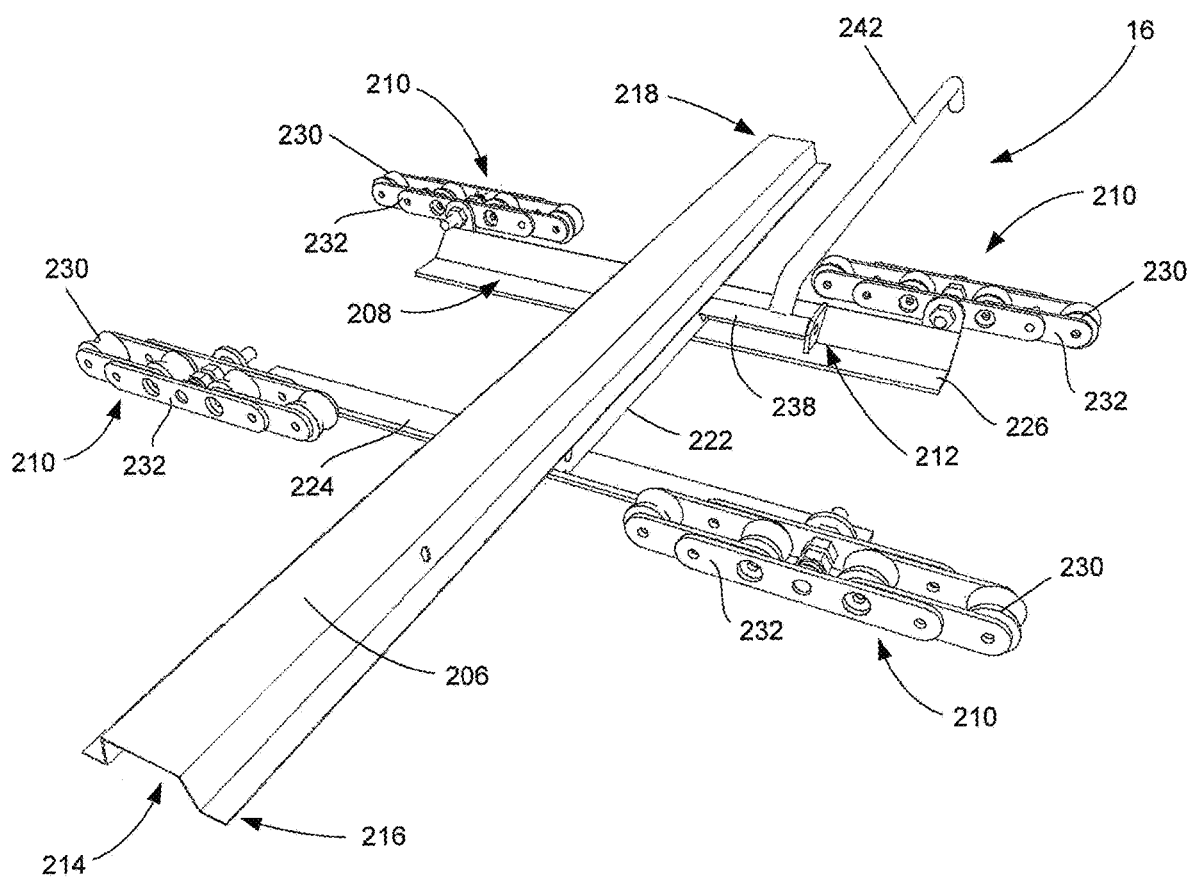
FIG. 18 is a side perspective view of the wheeled rib-engaging transfer cart of FIG. 6 shown separate from the roof, cart rails, bulk load of metal panels and track cart thereof.
Figure 19:
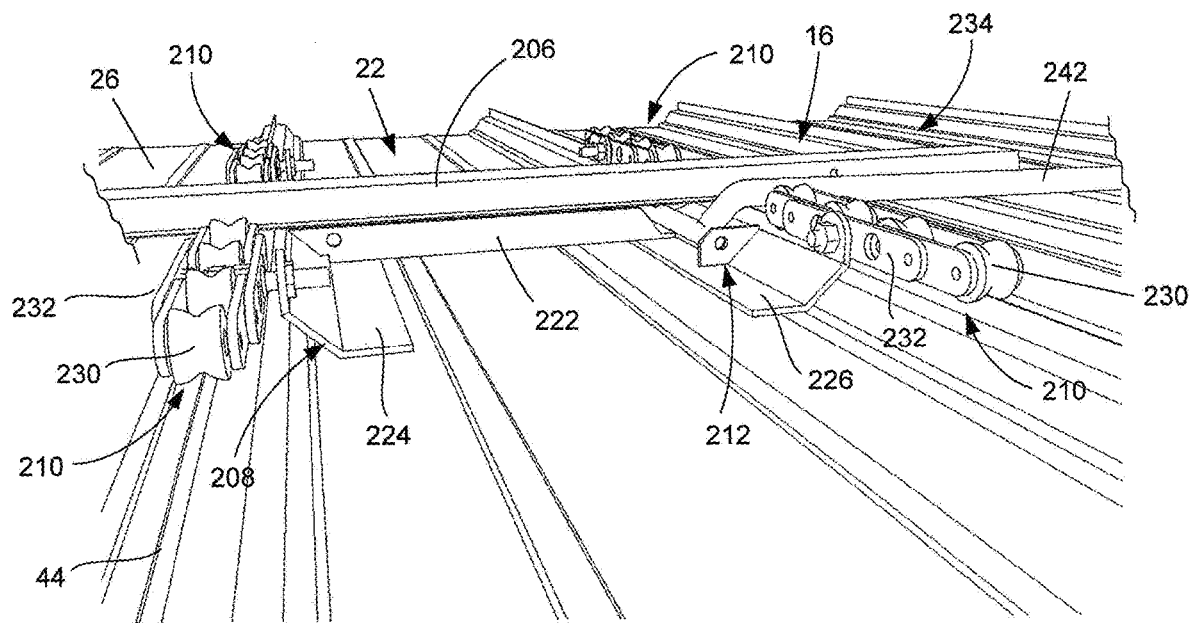
FIG. 19 is an end perspective view of the transfer cart of FIG. 15 shown with the rib-engaging mobility mechanism above a pair of ribs of a corrugated metal roof panel with the transfer cart shown in its lowered or stationary position.

The transfer cart 16 generally comprises an elongated support rail member 206, a transfer cart frame 208 supporting the support rail member 206, one or more transfer mobility assemblies 210 configured to moveably engage the cart path 204 and a pivot assembly 212 operatively associated with the cart frame 208 to raise the support rail member 206 and lower, as necessary, the one or more transfer mobility assemblies 210 onto the cart path 204, as best shown in FIGS. 18-20. In a preferred embodiment of the present invention, the external profile of the support rail member 206 is sized and shaped the same as, or slightly larger than, the cart rail 74 (i.e. has a member profile 214, shown in FIG. 18, that is the same as the rail profile 80 of the rail body 78 thereof) so that the support rail member 206 will fit in as a piece of the track 72, albeit much shorter than the typical cart rail 74, to allow the track cart 14 to pass over the support rail member 206 if the user desires to keep the track cart 14 moving in the first direction 60. More specifically, in a preferred configuration, the support rail member 206 should have the same, or nearly the same, size and shape as cart rail 74 so the mobility assemblies 142/144 of the track cart 14 will be able to move (i.e., by rolling) onto or, if desired, over and past the transfer cart 16 if the user does not desire to move the load 20 in the second direction 62 defined by the cart path 204. Alternatively, if the member profile 214 is not exactly the same as the rail profile 80, the member profile 214 should at least be cooperatively sized and configured with the rail profile 80 of the cart rail 74 so as to be utilized with the mobility assembly 142/144 components of the track cart 14 in substantially the same manner. If the user does desire to move the load 20 in the second direction 62, he or she will move the track cart 14 onto the support rail member 206, use the pivot assembly 212 to raise the support rail member 206, with the track cart 14 thereon (and load 20 on the track cart 14), and lower the one or more transfer mobility assemblies 210 onto cart path 204. In the embodiment shown in the figures, the pivot assembly 212 lowers each of the transfer mobility assemblies 210 onto the ribs 44 of the panels 26 that define the cart path 204. The transfer mobility assemblies 210 will engage the ribs 44 in a manner that allows the transfer cart 16 to move the load 20 to where it is needed or desired. As will be readily appreciated by persons skilled in the art, if the track 72 and cart paths 204 are laid out properly, the user can move the load 20 in a first direction 60, in a second direction 62, in the first direction 60 again, in the second direction 62 again and so on as he or she moves the load 20 across the surface 22 between a first area 136 and a second area 138.

The support rail member 206 has a first end 216 and a second end 218 that defines the length of the support rail member 206. As set forth above, in the preferred embodiments of the present invention, the length of the support rail member 206 is selected to fit into a gap 220 between sections of the track 72 defined by the cart rails 74, as shown in FIGS. 3-4, so as to create a continuous track 72 when the support rail member 206 of the transfer cart 16 is in alignment with the track 72 to allow the track cart 14 to move across the surface 22 in the first direction 60. When the transfer cart 16 moves in the second direction 62, the gap 220 at that portion of the path 72 will be opened. To complete the track 72, the transfer carts 16 are either moved back to the gap 220 or other transfer carts 16 are moved into the gap 220.

The transfer cart frame 208 supports the support rail member 206, each of the transfer mobility assemblies 210 and the pivot assembly 212. In the embodiment shown in the figures, transfer cart frame 208 comprises a transverse support member 222 that is positioned in alignment with the support rail member 206 and a pair of longitudinal support members, shown as first longitudinal support member 224 and second longitudinal support member 226, that are attached to or integral with transverse support member 222 and at least generally longitudinally aligned with the cart path 204 (as defined by the ribs 44 in the embodiment shown in the figures), as best shown in FIGS. 18-20. As set forth in more detail below, components of the pivot assembly 212 connect the transverse support member 222 to the support rail member 206 to raise or lower the support rail member 206, as shown with regard to FIGS. 19-20. In the embodiment shown in the figures, the transverse support member 222 has an upwardly disposed, generally U-shaped configuration that defines a channel 228, which is open at the upper side thereof, in which the lifting and lowering components of the pivot assembly 212 are moveably positioned, as best shown in FIG. 20. Each of the longitudinal support members 224/226 have a horizontally disposed section which, in some embodiments, can rest on the surface 22 (i.e., a valley 46 of the panels 26 which make up the metal roof 24) and an upwardly angled section to which one or more of the transfer mobility assemblies 210 are attached. In the embodiment shown in FIGS. 18-20, each transfer mobility assembly 210 is bolted to a mounting lug that is integrally formed with the angled section of the longitudinal support members 224/226. In the embodiment of the transfer cart 16 shown in the figures, there are four transfer mobility assemblies 210, with two transfer mobility assemblies 210 attached to each of the longitudinal support members 224/226. The size and shape of the longitudinal support members 224/226 is selected to, at least generally, correspond to the surface 22 and be cooperatively configured for use with the pivot assembly 212. As will be readily appreciated by persons skilled in the art, the transverse support member 222 and the longitudinal support members 224/226 of the transfer cart frame 208 can have a wide variety of different configurations and sizes as long as they are configured to support the support rail member 206, assist the pivot assembly 212 with raising and lowering the support rail member 206 and position the transfer mobility assemblies 210 where they moveably engage the cart path 204 (as defined by a pair of ribs 44 of the panels 26 when utilized with a surface comprising a plurality of corrugated panels 26, as shown for the surface 22 of the metal roof 24 in the figures).

As set forth above, the transfer cart 16 has one or more transfer mobility assemblies 210 that are each structured and arranged to moveably engage the cart path 204 on the surface 22 so as to move the load 20 in a second direction 62 (such as toward the second area 138). In the embodiment where the present invention is utilized on a surface 22 made up of a plurality of corrugated roof panels 26 having ribs 44 and valleys 46, the mobility assemblies 210 are each structured and arranged to moveably engage the ribs 44 so as to move in a second direction 62 along the cart path 204 defined by a pair of ribs 44, such as shown in FIGS. 6 and 19-20. To avoid damaging the metal panels 26, there should be a sufficient number of transfer mobility assemblies 210 to distribute the weight of the load 20 over a wide area and each transfer mobility assembly 210 should also be structured and arranged to distribute the weight at the mobility transfer assembly 210 over a length of a rib 44 to avoid crushing or otherwise damaging the rib 44 as the transfer cart 16 moves the load 20 (on the track cart 14) across the surface 22. As set forth above and shown in FIGS. 18-20, the transfer cart 16 of the present embodiment has four transfer mobility assemblies 210. Other types of and/or configurations of surfaces 22, such has a surface 22 having a solid hard surface 22 (i.e., concrete or the like), may require fewer or more transfer mobility assemblies 210 and have more or less issues with transferring the weight of the load 20 over the surface 22 to avoid damaging the surface 22.

The transfer mobility assemblies 210 are structured and arranged to move the transfer cart 16 along the cart path 204 in the second direction 62. In a typical use, the transfer cart 16 will moveably support the track cart 14 and load 20 as the transfer cart 16 moves along the cart path 204, as shown in FIG. 6. To accomplish the above, the transfer mobility assemblies 210 have a plurality of wheel members 230 that are configured to moveably engage the cart path 204, which may be formed by surface 22 or placed on surface 22 and one or more struts 232 that connect each transfer mobility assembly 210 to its respective longitudinal support member 224/226 and, if a plurality of wheel members 230 are utilized, connects the wheel members 230 together so they will distribute the weight of the load 20 across the cart path 204, as best shown in FIGS. 18-20. In the figures, because the track cart 14 is defined by a pair of ribs 44 of the panels 26 that make up the metal roof 24, each of the transfer mobility assemblies 210 are structured and arranged in cooperative arrangement with the panel profile 52 to moveably engage the ribs 44 to move the load 20 in the second direction 62 that is defined by the cart path 204. For such use, the transfer mobility assemblies 210 has a plurality of inline grooved wheels as the wheel members 230 and utilizes multiple struts 232 that are arranged to provide equal load distribution on the ribs 44, as shown in FIGS. 6 and 18-20. The inline grooved wheels, as wheel members 230, can comprise V-shaped caster wheels with roller bearings. Such wheel members 230 may also be track wheels and wheel rollers that are similar to the types that are utilized for gates and sliding doors. The inline grooved wheels 230 should be structured and arranged to engage the top surface 50 of the ribs 44 and support the weight of the load 20 as the transfer cart 16 moves along the cart path 204 defined by two or more ribs 44 of the panels 26. For surfaces 22 that are not made up of ribs 44 or the like on which the transfer cart 16 will move, other types of wheel members 230 may be more beneficial to utilized. For instance, some material transfer systems 10 may require the transfer cart 16 to move along a flat or generally flat surface, such as the bottom surface 48 of the valleys 46 of the panels 26. For such systems 10, it may be best for the rollers, wheels or other wheel members 230 to have a flat or curved surface (i.e., not V-shaped). Other material transfer systems 10 are likely to benefit from other configurations of the wheel members 230 and/or the struts 232 that are utilized to connect the transfer mobility assemblies 210 to the transfer cart frame 208 and/or to connect the wheel members 230 together.

As set forth above, the transfer cart 16 has a pivot assembly 212 that is structured and arranged to move the transfer cart 16 between a lower position 234, shown in FIG. 19, that allows the user to secure the support rail member 206 in place on the surface 22 to fill the gap 220 in order to provide a continuous track 72 for the track cart 14 to move across the surface 22 in the first direction 60 and a raised position 236, shown in FIG. 20, in which the transfer mobility assemblies 210 are engaged with the surface 22 in order to move the transfer cart 16 along the cart path 204. In the embodiments shown above, when the transfer cart 16 is in its lower position 234, support rail member 206 extends on top of the ends of the cart rail 74 adjacent the gap 220 such that the support rail member 206 is supported by the adjacent cart rails 74 and any ribs 44 between the ribs 44 that form the cart path 204. In other embodiments, the longitudinal support members 224/226 of the transfer cart frame 208 can be positioned against the surface 22, such as the upwardly facing surface 48 of one or more valleys 46, when the transfer cart 16 is in its lower position 234. In either configuration, it is likely to be beneficial that the transfer mobility assemblies 210 are positioned slightly above the engaging portion of the surface 22, such as the top surface 50 of the ribs 44, to keep the support rail member 206 in position in the gap 220, as shown in FIGS. 6 and 19. When the pivot mechanism 212 is operated to move the transfer cart 16 to its raised position 236, the transfer mobility assemblies 210 are lowered onto the engaging portion of the surface 22, such as the ribs 44 and the support rail member 206 is raised upward to move the support rail member 206 away from the adjacent cart rails 74 to allow the load 20, typically while still on the track cart 14, to be moved along the cart path 204 in the second direction 62. If the longitudinal support members 224/226 are held against the surface 22 when the transfer cart 26 is in its lower position 234, the longitudinal support members 224/226 are slightly lifted above the surface 22 when the transfer cart 16 is moved to its raised position 236.

The pivot assembly 212 generally comprises a pivot bar 238 which is rotatably secured to the transfer cart frame 208, one or more pivot support rods 240 that are each connected, directly or indirectly, to the pivot bar 238 and the support rail member 206 and a pivot handle 242 that is integral with or connected to the pivot bar 238 and positioned to be accessed by the user. In use, the user will grasp the pivot handle 242 and pivot the pivot handle 238 to rotate the pivot bar 238 which, depending on which direction the user moves the pivot handle 242, will raise or lower the one or more pivot support rods 240 to raise the support rail member 206 to allow movement of the transfer cart 16 along the cart path 204 in the second direction 62 or lower the support rail member 206 to place it in position to fill the gap 220 and form a portion of the track 72 to allow movement of the track cart 14 in the first direction 60, as shown with regards to FIGS. 6 and 19-20.

In the embodiment shown in the figures, the pivot bar 238 is an elongated cylindrical member that is rotatably secured to the second longitudinal support member 226, there are two pivot support rods 240 (one at or near each longitudinal support member 224/226) and the pivot handle 242 is an elongated cylindrical member that is shaped and configured to lay flat when the transfer cart 16 is in its lowered position 234 and extend upward when the transfer cart 16 is in its raised position 236, as shown in FIGS. 18-20. When the pivot handle 242 is in its upwardly extending position, as shown in FIG. 20, the pivot handle 242 can be utilized to push (typically) or pull the transfer cart 16 along the cart path 204 in the second direction 62. The pivot bar 238 is attached to a bearing associated with a bracket that is secured to the second longitudinal support member 226. The pivot support rods 240 are sized and configured to fit within the channel 228 formed by the transverse support member 222 and to support the weight of the track cart 14 and any load 20 that is carried thereon. One pivot support rod 240 is integral with or connected to the pivot bar 238 and the other pivot support rod 204 is pivotally attached to the transverse support member 222 and connected to the pivot bar 238 (or the other pivot support rod 240) so as to pivot upward or downward when the pivot bar 238 is rotated by the pivot handle 242. As will be readily appreciated by persons who are skilled in the art, a variety of different configurations can be utilized for the pivot assembly 212. For instance, the pivot bar 238 (and handle 242) can be associated with the first longitudinal support member 224, only a single pivot support rod 240 or more than two pivot support rods 240 can be utilized, the pivot support rods 240 can be fixedly or removably attached to the support rail member 206 or, in some circumstances, integrally formed therewith. As well known to persons skilled in the art, any of the pivot bar 238, pivot support rods 240 and pivot handle 242 can take on a wide variety of different sizes and shapes other than those shown in the figures.

The material transfer system 10 generally comprises a track assembly 12 on a surface 22, a track cart 14 configured to move a load 20 in a first direction 60 across the track assembly 12, a transfer cart 16 configured to receive the track cart 14 and to move the load 20 (while it is still on the track cart 14) in a second direction 62 along a cart path 204 on the surface 22 to easily, efficiently and safely move the load 20 from a first area 136 to a second area 138 on the surface 22 so the load 20 can be utilized or installed on surface 22. Although the components of the new material transfer system 10 must be sufficiently strong to support the anticipated weight of the load 20, as well as the track cart 14 for the transfer cart 16, the components thereof can be made out of a wide variety of different materials, including metal, composites, certain plastics and the like. For use to move heavy panel bundles 54 on a metal roof 24, it is likely preferred that the majority of the components of the new material transfer system 10 will be made out of steel or the like, which may be powder coated or otherwise treated or covered to reduce the likelihood of rust or other damage due to exposure to the elements. As will be readily appreciated by persons skilled in the art, the wheel members 230 can be made out of metal, rubber, plastic, composites or the like that are selected to be able to moveably engage the cart path 204, which in the figures is defined by a pair of spaced apart ribs 44 of the metal roof panels 26.

A material transfer method 18 that is configured according to one of the preferred embodiments of the present invention generally comprises the steps of: (1) providing a surface 22 with at least a first area 136 and a second area 138; (2) positioning a track assembly 12 on the surface 22 to define a track 72 across the surface 22 in order to move a load 20 across the surface 22 in a first direction 60 from the first area 136; (3) placing the load 20 on the track 72 at the first area 136; (4) engaging the load 20 at the first area 136 with a transfer cart 14 that is structured and arranged to raise the load 20 above the track and moveably engage the track 72; and (5) moving the load 20 across the surface 22 with the track cart 14 along the track 72 in the first direction 60 to the second area 138. In the embodiment shown in the figures, the track 72 is made up of a plurality of cart rails 74 that are secured to the surface 22 with one or more rail mounting assemblies 76 for each cart rail 74 and the track cart 14 has cart base 140 that is sized and configured to receive and support the load 20, a first mobility assembly 142 and a second mobility assembly 144 that are structured and arranged to allow the track cart 14 to move along the track 72, and a cart handle 146 that is utilized to secure the mobility assemblies 142/144 to the cart base and to move the track cart 14 along the track 72. In use, the rail mounting assemblies 76 are attached to the surface 22 and the cart rails 74 are placed on the rail mounting assemblies 76 to form the track 72 prior to placing the load 20 at the first area 136. The cart base 140 placed under the load 20 while the load 20 is sitting on the track 72, the first mobility assembly 142 is positioned at the first end 148 of the cart base 140 by raising the first end 148 thereof upward using the cart handle 146, the second mobility assembly 144 is positioned at the second end 150 of the cart base 140 by rasing the second end 150 thereof upward using the cart handle 146 and the cart handle 146 is attached to the cart base 140 to push or pull the cart base 140, with the load 20 thereon, across the surface 22 along the track 72.

The material transfer method 18 that is configured according to an embodiment of the present invention that also moves the load 20 in a second direction 62 generally comprises the steps of: (1) providing a surface 22 with at least a first area 136 and a second area 138; (2) positioning a track assembly 12 on the surface 22 to define a track 72 across the surface 22 in order to move a load 20 across the surface 22 in a first direction 60 from first area 136; (3) defining a cart path 204 extending in a second direction 62 to move the load 20 toward the second area 138; (4) placing the load 20 on the track 72 at the first area 136; (5) engaging the load 20 at the first area 136 with a transfer cart 14 that is structured and arranged to raise the load 20 above the track and moveably engage the track 72; (6) moving the load 20 across the surface 22 with the track cart 14 along the track 72 in the first direction 60; (7) positioning the track cart 14 on a transfer cart 16 located in the track 72 at the cart path 204; (8) securing the track cart 14 to the transfer cart 16; (9) separating the transfer cart 16 from the track 72 and moveably engaging the transfer cart with the cart path 204; and (10) moving the transfer cart 16, having the track cart 14 and load 20 thereon, along the cart path 204 in the second direction 62 to the second area 138. In the embodiment shown in the figures, the transfer cart 16 has a support rail member 206, a transfer cart frame 208 connected to the support rail member 206, one or more (typically a plurality) of transfer mobility assemblies 210 attached to the transfer cart frame 208 and a pivot assembly 212 interconnecting the transfer cart frame 208 and the support rail member 206 so as to move the transfer cart 16 between a lowered position 234 with the track cart 16 part of the track 72 and a raised position 236 to move the track cart 16 along the cart path 204 in the second direction 204 to the second area 138. In use, support rail member 206 is structured and arranged in corresponding relation to the cart rails 74 to form part of the track 72 for the track cart 14 when the transfer cart 16 is in its lowered position 234. When the pivot assembly 212 is operated by the user to place the transfer cart 16 in its raised position 236 and the pivot assembly 212 raises the support rail member 206 from the track 72 and engages the transfer mobility assemblies 210 with cart path 204 to allow the user to move the transfer cart 16, with the track cart 14 and load 20 thereon, across the surface 22 in the second direction 62 to or at least toward the second area 138. In the embodiment shown in the figures, the cart path 204 is defined by the ribs 44 of the panels 26 which form the metal roof 24 that is the surface 22, the transfer mobility assemblies 210 are structured and arranged to moveably engage the ribs 44 and the pivot assembly 212 has a pivot handle 242 that can be utilized to push or pull the transfer cart 16 across the surface 22 in the second direction 62 along the cart path 204. To prevent the track cart 14 from rolling off of or otherwise moving relative to the transfer cart 16 when the track cart 14 (and the load 20) is positioned thereon, the user should utilize a securing mechanism, such as ropes, cords, chains or the like, to secure the track cart 14 on the transfer cart 16. In one embodiment, the securing mechanism can comprise one or more bungee cords.

A wide variety different configurations can be utilized for the material transfer system 10 and method 18 and the various components utilized therewith to move a load 20 across a surface 22. For instance, the cart rail 74 can be mounted or attached directly to the surface 22 without use of the rail mounting assembly 76 or the cart rail 74 and rail mounting assembly 76 can be integrally formed, with the rail mounting assembly 76 thereof configured to engage the surface 22. The new system 10 and method 18 can be utilized with a wide variety of different surfaces 22, including flat surfaces 22 or surfaces 22 that are specially configured to utilize and take advantage of the track cart 14 and transfer cart 16. For a flat surface 22, the system 10 and method 18 described above could be utilized by mounting a plurality of L-shaped brackets, upside down V-shaped brackets and the like onto the flat surface 22 and attaching the clamping mechanism 128 of the rail mounting assemblies 76 to the upwardly extending portion thereof, with the cart rails 74 placed onto the rail mounting assemblies 76 to define the path 72 across the surface 22 for the track cart 14. Likewise, a plurality of upwardly extending rails can be placed on the surface 22 to define the cart path 204 and the transfer mobility assemblies 210 of the transfer cart 16 can be sized and configured to moveably engage the rails to move the transfer cart 16 in the second direction 62. In another configuration, the transfer mobility assemblies 210 can be structured and arranged to moveably engage a cart path 204 that is countersunk into (i.e., below) the surface 22. Such a cart path 204 can have rails or other upwardly extending members, which however do not extend above the surface 22, that are moveably engaged by the wheel members 230 of the transfer mobility assemblies 210 of the transfer cart 16 in substantially the same manner as the wheel members 230 engage the ribs 44 of the panels 26. In other embodiments, the cart path 204 can be defined by grooves or other indented areas, such as the valleys 46 of the corrugated panels 26, and the transfer mobility assemblies 210 can be structured and arranged with wheel members 230 or other devices that moveably engage the indented areas (or valleys 46) to allow the user to move the transfer cart 16 in the second direction 62. Likewise, the track 72 on which the transfer cart 14 moves can be configured with grooves or other indented areas above or in the surface 22 and the mobility assemblies 142/144 thereof can be configured to move along the surface 22 in the grooves.

While there are shown and described herein specific forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there may be numerous components of the embodiments described herein that can be readily replaced with equivalent functioning components to accomplish the objectives and obtain the desired aspects of the present invention. As an example, electric motorized carts can be utilized to eliminate the need for human force to transport materials across the surface. The various embodiments set forth herein are intended to explain the best mode of making and using the present invention as currently known to and appreciated by the present inventor(s) and to enable other persons who are skilled in the relevant art to make and utilize the present invention. Although, the described embodiments may comprise different features, not all of these features are required in all embodiments of the present invention. More specifically, as will be readily appreciated by persons who are skilled in the art, certain embodiments of the present invention only utilize some of the features and/or combinations of features disclosed herein.

What is claimed is:

1. A material transfer system for moving a load across a surface from a first area to a second area thereon, said system comprising:

a track assembly having a plurality of cart rails configured to be attached to the surface to define the first area where the load is positioned and a track that is configured to allow the load to be moved in a first direction from the first area, each of said cart rails having a rail body defining a rail profile;

a track cart structured and arranged to support the load thereon and moveably engage the track so as to move the load in said first direction across the surface, said track cart having a cart base configured to be placed under the load while the load is positioned on the track at the first area and one or more mobility assemblies that are each structured and arranged in corresponding relation to said rail profile of said cart rails to moveably engage the track and allow movement of the load in the first direction along said track; and a transfer cart structured and arranged to receive said track cart with the load thereon and to move said track cart in a second direction toward the second area along a cart path associated with the surface, said transfer cart having a transfer cart frame, one or more transfer mobility assemblies attached to said transfer cart frame, a support rail member and a pivot assembly interconnecting said transfer cart frame and said support rail member, said support rail member structured and arranged in corresponding relation to said rail profile of said cart rails so as to be placed in alignment with said cart rails to further define said track and allow said one or more mobility assemblies of said track cart to move across said transfer cart in said first direction, each of said transfer mobility assemblies being structured and arranged to moveably engage said cart path, said pivot assembly structured and arranged to move said transfer cart between a lowered position wherein said support rail member is integrated into said track and a raised position where said support rail member is separated from said track and each of said transfer mobility assemblies are engaged with said cart path to allow movement of said transfer cart along said cart path in said second direction.

2. The system of claim 1, wherein said track cart has a first mobility assembly at a first end of said cart base, a second mobility assembly at a second end of said cart base and a cart handle adapted to be attached to said cart base.

3. The system of claim 2, wherein said cart handle is cooperatively structured and arranged with said cart base to engage said cart base under the load and lift at least one of said first end and said second end of said cart base to secure, respectively, said first mobility assembly to said first end of said cart base and/or said second mobility assembly to said second end of said cart base.

4. The system of claim 1, wherein said cart base has a first arm member, a second arm member and a cross-member in a U-shaped configuration to define an arm gap that is open at a first end of said cart base to allow said first end of said cart base to be slid under the load when the load is sitting on the track assembly at the first area of the surface.

5. The system of claim 1, wherein each of said mobility assemblies have a roller wheel mounted on an elongated axle extending outwardly from said roller wheel and a mobility mounting device at each of a first end and a second end of said axle, said cart frame having a mobility assembly mount for each of said mobility assemblies that is structured and arranged to engage said respective mobility mounting device so as to respectively secure each of respective said mobility assemblies to said ends of said cart base.

6. The system of claim 1, wherein said rail body of each of said cart rails has a center section with an upwardly positioned surface and each of said one or more mobility assemblies of said track cart have a roller wheel that is sized and configured to moveably engage said center section and roll along said surface thereof to allow said track cart to move across said surface in said first direction.

7. The system of claim 1, wherein said track assembly further comprises at least one rail mounting assembly for each of said cart rails, each of said rail mounting assemblies configured to securely engage the surface and to receive one of said cart rails thereon to secure said cart rail on said surface to define said track.

8. The system of claim 7, wherein each of said rail mounting assemblies has a rail section cooperatively configured with said rail profile of said rail body so as to securely receive said cart rail thereon.

9. The system of claim 8, wherein said surface comprises a plurality of corrugated panels that each have one or more ribs associated therewith and each of said rail mounting assemblies has a securing mechanism that is structured and arranged to engage a rib of one of said plurality of corrugated panels to secure the rail mounting assembly to the surface.

10. The system of claim 1, wherein the surface comprises a plurality of corrugated panels that each have one or more upwardly extending ribs that define said cart path for moving said transfer cart in said second direction, said track assembly comprising at least one rail mounting assembly for each of said cart rails, each of said rail mounting assemblies having a rail section and a securing mechanism associated with said rail section, said rail section sized and configured to receive one of said plurality of cart rails thereon so as to hold said track in place on said surface, said securing mechanism structured and arranged to engage one of said upwardly extending ribs so as to secure said rail mounting assembly to one of said plurality of corrugated panels.

11. The system of claim 1, wherein each of said transfer mobility assemblies comprise one or more wheel members and one or more struts, each of said one or more wheel members configured to moveably engage the cart path, each of said one or more struts configured to distribute the weight of the load along said cart path.

12. The system of claim 11, wherein the surface comprises a plurality of corrugated panels that each comprise one or more upwardly extending ribs that define said cart path, said one or more wheel members of said transfer mobility assemblies being configured to moveably engage said ribs defining said cart path.

13. A material transfer system for moving a load across a surface defined by a plurality of corrugated panels that each have at least one upwardly extending rib, the material transfer system configured to move the load from a first area to a second area on the surface, said system comprising:
  a track assembly having a plurality of cart rails that are configured to be attached to the surface by one or more rail mounting assemblies, each of said cart rails defining the first area where the load is positioned and a track that is configured to allow the load to be moved in a first direction from the first area, each of said cart rails having a rail body defining a rail profile, each of said rail mounting assemblies being structured and arranged to secure one of said plurality of cart rails to the rib of one of said plurality of corrugated panels;
  a track cart structured and arranged to support the load thereon and moveably engage the track so as to move the load in said first direction across the surface, said track cart having a cart base configured to be placed under the load while the load is positioned on the track at the first area and one or more mobility assemblies that are each structured and arranged in corresponding relation to said rail profile of said cart rails to moveably engage the track and allow movement of the load in the first direction along said track; and
  a transfer cart structured and arranged to receive said track cart with the load thereon and to move said track cart in a second direction toward the second area along a cart path that is defined by one or more of the ribs of the plurality of corrugated panels, said transfer cart having a support rail member structured and arranged in corresponding relation to said rail profile of said cart rails so as to be placed in said cart path in alignment with said cart rails to further define said track and allow said one or more mobility assemblies of said track cart to move across said transfer cart in said first direction.

14. The system of claim 13, wherein said rail body of each of said cart rails has a center section with an upwardly positioned surface and each of said one or more mobility assemblies of said track cart have a roller wheel that is sized and configured to moveably engage said center section and roll along said surface thereof to allow said track cart to move across said surface in said first direction.

15. The system of claim 13, wherein each of said rail mounting assemblies has a rail section and a securing mechanism, said rail section being cooperatively configured with said rail profile of said rail body so as to receive said cart rail thereon and to hold said cart rail on the surface, said securing mechanism attached to or integral with said rail section to engage the rib of one of said plurality of corrugated panels.

16. The system of claim 13, wherein said track cart has a first mobility assembly at a first end of said cart base, a second mobility assembly at a second end of said cart base and a cart handle attached to or adapted to be attached to said cart base, said cart base having a first arm member, a second arm member and a cross-member in a U-shaped configuration to define an arm gap that is open at said first end of said cart base to allow said first end of said cart base to be slid under the load when the load is sitting on the track assembly at the first area of the surface.

17. The system of claim 16, wherein each of said first mobility assembly and said second mobility assembly have a roller wheel mounted on an elongated axle extending outwardly from said roller wheel and a mobility mounting device at each of a first end and a second end of said axle, said cart frame having a mobility assembly mount for each of said first mobility assembly and said second mobility assembly that is structured and arranged to engage said respective mobility mounting device so as to respectively secure each of said first mobility assembly and said second mobility assembly to said ends of said cart base.

18. The system of claim 13, wherein said transfer cart has a transfer cart frame, one or more transfer mobility assemblies attached to said transfer cart frame and a pivot assembly interconnecting said transfer cart frame and said support rail member, each of said transfer mobility assemblies being structured and arranged to moveably engage said one or more ribs of said cart path, said pivot assembly structured and arranged to move said transfer cart between a lowered position wherein said support rail member is integrated into said track and a raised position where said support rail member is separated from said track and each of said transfer mobility assemblies are engaged with said cart path to allow movement of said transfer cart along said cart path in said second direction.

19. A method of moving a load, said method comprising the steps of:
   (1) providing a surface having at least a first area and a second area;
   (2) positioning a track assembly on the surface to define a track across the surface that will allow the load to be moved from the first area across the surface in a first direction to a gap in said track wherein a cart path extends in a second direction to allow the load to be moved toward the second area;
   (3) placing the load on said track at the first area of the surface;
   (4) engaging the load at the first area with a transfer cart having a cart base with one or more mobility assemblies associated therewith, said cart base being structured and arranged to support the load above the track, each of said one or more mobility assemblies configured to moveably engage the track;
   (5) moving the load across the surface with the track cart along the track in said first direction;
   (6) positioning said track cart on a transfer cart integrated into said track at said gap in said track;
   (7) separating said transfer cart from said track and moveably engaging said transfer cart with said cart path; and
   (8) moving said transfer cart, with said track cart and the load thereon, along said cart path in said second direction toward the second area,
      wherein said surface has a plurality of corrugated panels that each have one or more upwardly extending ribs, said track assembly further comprising a plurality of cart rails and a rail mounting assembly for each one of said cart rails, each of said rail mounting assemblies having a rail section and a securing mechanism associated therewith so as to engage one of said ribs to secure said rail section to said surface, said rail section cooperatively configured with said cart rails so as to receive one of said cart rails thereon to hold said track assembly on said surface.

20. The method of claim 19, wherein each of said cart rails has a rail body with a center section having an upwardly positioned surface and each of said one or more mobility assemblies of said track cart have a roller wheel that is sized and configured to moveably engage said center section and roll along said surface thereof to allow said track cart to move across said surface in said first direction.

21. The method of claim 19 further comprising the step of positioning said transfer cart in said gap of said track before said step of positioning said track cart on said transfer cart, said track having a plurality of track rails that each have a rail body defining a rail profile, said transfer cart having a support rail member that has a member profile which is configured in corresponding relation to said rail profile of said rail body of said track rails so as to integrate said support rail member of said transfer cart into said track to allow said track cart to move across said transfer cart when said track cart is moving in said first direction.

22. The method of claim 21, wherein said ribs further define said cart path, said track cart having one or more transfer mobility assemblies that are each configured to moveably engage said ribs defining said cart path so as to allow said transfer cart to be moved in said second direction.

23. The method of claim 22, wherein said transfer cart further comprises a transfer cart frame and a pivot assembly interconnecting said transfer cart frame and said support rail member, said one or more transfer mobility assemblies attached to said transfer cart frame, said pivot assembly structured and arranged to move said transfer cart between a lowered position wherein said support rail member is integrated into said track and a raised position where said support rail member is separated from said track and each of said transfer mobility assemblies are engaged with said cart path to allow movement of said transfer cart along said cart path in said second direction.

24. The method of claim 19 further comprising the step of securing said track cart to said transfer cart prior to said separating step.

25. A material transfer system for moving a load across a surface from a first area to a second area thereon, said system comprising:
   a track assembly having a plurality of cart rails configured to be attached to the surface to define the first area where the load is positioned and a track that is configured to allow the load to be moved in a first direction from the first area, each of said cart rails having a rail body defining a rail profile;
   a track cart structured and arranged to support the load thereon and moveably engage the track so as to move the load in said first direction across the surface, said track cart having a cart base configured to be placed under the load while the load is positioned on the track at the first area, a first mobility assembly at a first end of said cart base, a second mobility assembly at a second end of said cart base and a cart handle adapted to be attached to said cart base, each of said first mobility assembly and said second mobility assembly being structured and arranged in corresponding relation to said rail profile of said cart rails to moveably engage the track and allow movement of the load in the first direction along said track, said cart handle cooperatively structured and arranged with said cart base to engage said cart base under the load and lift at least one of said first end and said second end of said cart base to secure, respectively, said first mobility assembly to said first end of said cart base and/or said second mobility assembly to said second end of said cart base; and
   a transfer cart structured and arranged to receive said track cart with the load thereon and to move said track cart in a second direction toward the second area along a cart path associated with the surface, said transfer cart having a support rail member structured and arranged in corresponding relation to said rail profile of said cart rails so as to be placed in alignment with said cart rails to further define said track and allow said one or more mobility assemblies of said track cart to move across said transfer cart in said first direction.

26. The system of claim 25, wherein said track assembly further comprises at least one rail mounting assembly for each of said cart rails, each of said rail mounting assemblies configured to securely engage the surface and to receive one of said cart rails thereon to secure said cart rail on said surface to define said track, each of said rail mounting assemblies having a rail section cooperatively configured with said rail profile of said rail body so as to securely receive said cart rail thereon.

\* \* \* \* \*